(12) United States Patent
Kimura

(10) Patent No.: US 7,102,673 B2
(45) Date of Patent: Sep. 5, 2006

(54) DEFECTIVE PIXEL SPECIFYING METHOD, DEFECTIVE PIXEL SPECIFYING SYSTEM, IMAGE CORRECTING METHOD, AND IMAGE CORRECTING SYSTEM

(75) Inventor: Hajime Kimura, Atsugi (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 574 days.

(21) Appl. No.: 10/082,101

(22) Filed: Feb. 26, 2002

(65) Prior Publication Data

US 2002/0122123 A1    Sep. 5, 2002

(30) Foreign Application Priority Data

Mar. 1, 2001    (JP) .............................. 2001-057422

(51) Int. Cl.
 *H04N 9/64* (2006.01)
(52) U.S. Cl. ...................... 348/246; 345/173; 382/275
(58) Field of Classification Search ................ 348/246, 348/247, 243, 251; 382/279; 248/297; 358/461, 464
See application file for complete search history.

(56) References Cited

U.S. PATENT DOCUMENTS

| | | | | |
|---|---|---|---|---|
| 4,320,292 A | * | 3/1982 | Oikawa et al. | 250/227.11 |
| 4,345,248 A | * | 8/1982 | Togashi et al. | 345/90 |
| 4,562,473 A | * | 12/1985 | Levine | 348/244 |
| 4,589,025 A | * | 5/1986 | Monahan et al. | 348/243 |
| 4,630,121 A | * | 12/1986 | Suzuki et al. | 348/245 |
| 4,679,087 A | * | 7/1987 | Torrano et al. | 348/673 |
| 4,698,460 A | * | 10/1987 | Krein et al. | 345/173 |
| 4,785,564 A | * | 11/1988 | Gurtler | 40/448 |
| 4,794,634 A | * | 12/1988 | Torihata et al. | 379/93.19 |
| 4,806,780 A | * | 2/1989 | Yamamoto et al. | 348/251 |
| 4,814,760 A | * | 3/1989 | Johnston et al. | 345/104 |
| 4,845,551 A | * | 7/1989 | Matsumoto | 358/506 |
| 5,047,861 A | * | 9/1991 | Houchin et al. | 348/247 |
| 5,105,186 A | * | 4/1992 | May | 345/175 |
| 5,157,502 A | * | 10/1992 | Nakajima et al. | 348/296 |
| 5,182,447 A | * | 1/1993 | Nakayama | 250/208.1 |
| 5,204,661 A | * | 4/1993 | Hack et al. | 345/88 |
| 5,233,180 A | * | 8/1993 | Tsuruta et al. | 250/208.1 |

(Continued)

FOREIGN PATENT DOCUMENTS

JP    07-336605    12/1995

OTHER PUBLICATIONS

Baxes, Gregory A., Digital Image Processiing, 1994, John Wiley & Sons, Inc., ISBN 0-471-00949-0.*

*Primary Examiner*—Matthew C. Bella
*Assistant Examiner*—Sath V. Perungavoor
(74) *Attorney, Agent, or Firm*—Eric J. Robinson; Robinson Intellectual Property Law Office, P.C.

(57) ABSTRACT

A defective pixel specifying method and a defective pixel specifying system for a semiconductor device having a defective pixel are provided. Also provided are an image correcting method and an image correcting system for making a defective pixel inconspicuous on the screen when a read image is displayed. The present invention determines whether or not there is a defective pixel for each pixel and specifies the coordinate of the defective pixel using image signals obtained by reading a plurality of images. The image signal of the defective pixel is set based on the image signals of the pixels adjacent to the defective pixel to correct the image of the subject read.

16 Claims, 19 Drawing Sheets

U.S. PATENT DOCUMENTS

| | | | |
|---|---|---|---|
| 5,237,172 A * | 8/1993 | Lehman et al. | 250/235 |
| 5,243,332 A * | 9/1993 | Jacobson | 345/44 |
| 5,333,068 A * | 7/1994 | Sakai et al. | 358/500 |
| 5,339,090 A * | 8/1994 | Crossland et al. | 345/90 |
| 5,398,119 A * | 3/1995 | Suzuki et al. | 358/461 |
| 5,416,516 A * | 5/1995 | Kameyama et al. | 348/246 |
| 5,420,703 A * | 5/1995 | Sakai et al. | 358/501 |
| 5,594,248 A * | 1/1997 | Tanaka | 250/332 |
| 5,610,629 A * | 3/1997 | Baur | 345/104 |
| 5,638,123 A * | 6/1997 | Yamaguchi | 348/364 |
| 5,729,251 A * | 3/1998 | Nakashima | 709/250 |
| 5,767,842 A * | 6/1998 | Korth | 345/168 |
| 5,771,106 A * | 6/1998 | Taguchi et al. | 358/461 |
| 5,844,695 A * | 12/1998 | Suzuki | 358/475 |
| 5,886,353 A * | 3/1999 | Spivey et al. | 250/370.09 |
| 5,933,190 A * | 8/1999 | Dierickx et al. | 348/302 |
| 6,191,873 B1 * | 2/2001 | Mizoguchi et al. | 358/516 |
| 6,337,681 B1 * | 1/2002 | Martin | 345/178 |
| 6,388,778 B1 * | 5/2002 | Ko-Chien | 358/497 |
| 2001/0030704 A1 | 10/2001 | Kimura | |
| 2001/0030775 A1 * | 10/2001 | Suzuki | 358/475 |
| 2001/0038065 A1 | 11/2001 | Kimura | |
| 2002/0012057 A1 | 1/2002 | Kimura | |
| 2002/0015111 A1 * | 2/2002 | Harada | 348/642 |

* cited by examiner

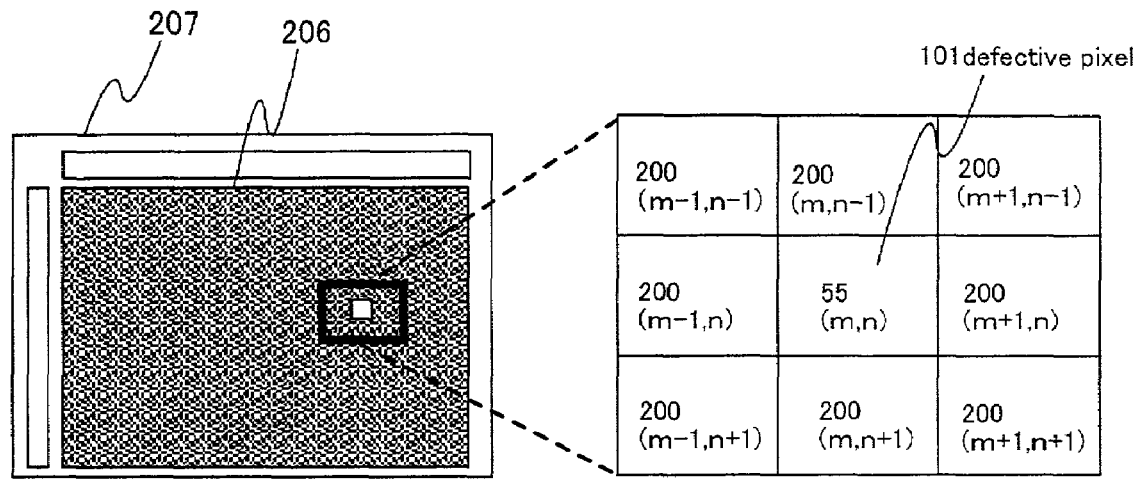
Fig. 1A
Fig. 1B
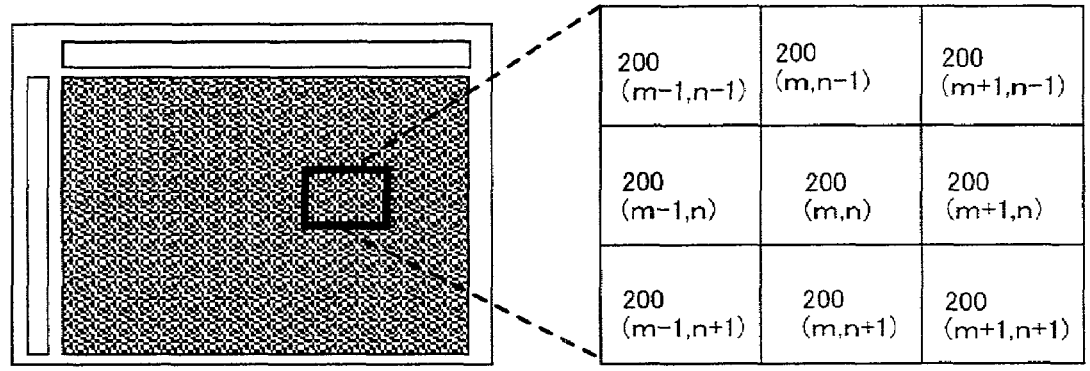
Fig. 1C
Fig. 1D

DEFECTIVE PIXEL SPECIFYING METHOD, DEFECTIVE PIXEL SPECIFYING SYSTEM, IMAGE CORRECTING METHOD, AND IMAGE CORRECTING SYSTEM

BACKGROUND OF THE INVENTION

1. Field of the Invention

The present invention relates to a defective pixel specifying method and a defective pixel specifying system for a semiconductor device having an image sensor function. The present invention also relates to an image correcting method and an image correcting system for an image read by a semiconductor device having an image sensor function.

2. Description of the Related Art

Various kinds of sensors are developed and put into practice accompanying technology advancement of late. These sensors are used mainly to convert text and image information on paper into data for personal computers. Most of those sensors are semiconductor devices having an image sensor function.

Examples of the above semiconductor devices include digital still cameras, scanners, and copying machines. Digital still cameras are used as replacements for conventional silver film cameras, and have area sensors in which pixels are arranged two-dimensionally. Scanners and copying machines are used as means for reading text and image information on paper, and have line sensors in which pixels are arranged one-dimensionally.

Scanners can be roughly divided by their reading methods into three types; (1) sheet feeding type, (2) flat bed type, and (3) pen type (handy type). The sheet feeding type fixes an image sensor unit of a scanner and the original is moved along by a sheet feeder to read the original. The flat bed type fixes the original on glass and an image sensor unit is moved under the glass to read the original. The pen type (handy type) reads the original when a user moves an image sensor unit on the original.

Scanners of the above three types all employ optical systems. Flat bed type scanners read images finely and therefore often employ demagnification optical systems. A lens used in a demagnification optical system has a long focal distance and, therefore, the distance between a subject and an image sensor unit is large, resulting in a large-sized semiconductor device.

In order to make sheet feeding type and pen type (handy type) scanners portable, the devices have to be small in size. Accordingly, nonmagnification optical systems are employed in many cases. A nonmagnification optical system has a rod lens array interposed between an image sensor unit and a subject. The rod lens array is a bunch of plural rod lenses having a distributed index of refraction. The rod lens array forms an image at 1:1 and therefore has a short focal distance to make the distance between the image sensor and a subject small.

Manufacturers of scanners recommend purchasers of their products to conduct calibration before starting reading a subject.

Calibration is recommended for the following two reasons.

Firstly, a subject is not irradiated uniformly with light from a light source in a scanner. As described above, a lens such as a demagnification optical system or a rod lens array is used in a scanner. Light from the light source provided in the scanner irradiates a subject through those lenses. Accordingly, the intensity of light that irradiates a subject may vary between different areas of the subject.

Secondly, fluctuation in characteristic between pixels of the image sensor can be corrected by calibration. The fluctuation corresponds to a slight difference in signal value read by pixels when the scanner reads a subject that has identical information all over its surface. The fluctuation between pixels causes a difference in signal value outputted from a photoelectric conversion element even when light from the light source irradiates the subject at the same intensity. In most cases, the fluctuation in characteristic between pixels does not change with time.

Thus, calibration on a purchased scanner before starting reading a subject is recommended. In fact, some of scanners on the market contain in their packages calibration sheets having the same sizes as their effective reading range. Calibration sheets are white plastic sheets. Preferably, calibration sheets are untransmissive, solid and plastic sheets. It is also preferable for calibration sheets to have flat surfaces with no hole or dent.

After a calibration sheet is read, all pixels should read identical information. However, information actually read may vary from the two reasons given in the above. Therefore, information when the white sheet is read is stored in a program in the scanner or other devices or media. Then, each time a subject is read, correction is made based on the stored information. Once calibration is conducted, the information is stored in a memory or the like and it is not necessary to repeat calibration.

The method of calibration differs from one semiconductor device to another. For instance, a scanner uses a calibration sheet for calibration. A digital still camera is sold with calibration software included in the package. Then, calibration is conducted using the software. With a digital still camera, a picture is taken through a lens and sometimes the image is slightly distorted. Distortion is measured through calibration. A correction value for distortion of the lens is calculated and inputted to a program of the digital still camera to reduce the influence of the distortion as much as possible.

A semiconductor device having an image sensor function is provided with a pixel portion that has a plurality of pixels. Each of the pixels has a photoelectric conversion element and one or more transistors for controlling the photoelectric conversion element.

Semiconductor devices having an image sensor function are roughly divided into CCD type and CMOS type. CMOS type semiconductor devices are further classified into passive semiconductor devices to which amplifying transistors are not mounted and active semiconductor devices to which amplifying transistors are mounted. An amplifying transistor has a function of amplifying an image signal of a subject read by a photoelectric conversion element.

An active semiconductor device has, in addition to an amplifying transistor as the one described above, semiconductor elements such as a sensor selecting transistor. Accordingly, the number of elements in one pixel is large. When elements in one pixel are increased in number, the yield in manufacturing the semiconductor device lowers.

As a result, it is very difficult to obtain a semiconductor device having no defective pixel. When forming a semiconductor device, a semiconductor device sometimes fails to form a photoelectric conversion element in a pixel, or one of plural transistors for controlling the photoelectric conversion element, properly. A pixel having a failed element cannot operate normally and therefore is incapable of reading the image of a subject correctly. When a semiconductor device having a defective pixel displays an image of a subject read, the defective pixel is often shown as a white dot or a black dot on the screen. Thus the defective pixel on the screen is very noticeable and keeps the semiconductor device from displaying the accurate image of the subject read.

SUMMARY OF THE INVENTION

The present invention has been made in view of the problems above, and an object of the present invention is therefore to provide a defective pixel specifying method and a defective pixel specifying system for a semiconductor device having a defective pixel. Another object of the present invention is to provide an image correcting method and an image correcting system for making a defective pixel inconspicuous on the screen when a read image is displayed.

The present invention employs the following measures to attain the above objects. Now, a brief description is given on the present invention with reference to FIGS. 1A to 1D.

FIG. 1A shows an example in which an image of a subject in a uniform middle tone is read by a semiconductor device with pixels each including a photoelectric conversion element and is displayed in a display unit 206 (pixel portion 206) of an arbitrarily-chosen display device 207. FIG. 1B is an enlarged view of the area surrounded by bold lines forming a rectangle in FIG. 1A. FIG. 1B shows a pixel (m, n), pixels (m±1, n), pixels (m±1, n±1), and pixels (m, n±1). Numbers in the rectangles each representing a pixel represent image signals. As shown in FIG. 1B, image signals of pixels adjacent to the pixel (m, n) are all 200 whereas the image signal of the pixel (m, n) itself is 55. The pixel (m, n) is therefore a defective pixel 101, and does not read information of a subject correctly.

Then, the defective pixel specifying method and image correcting method of the present invention are applied to this device. The defective pixel specifying method of the present invention is a defective pixel specifying method characterized by comprising:

a first step of using a photoelectric conversion element to obtain plural image signals for each of pixels;

a second step of calculating for each of the pixels a first difference or first ratio of the plural image signals obtained in the first step;

a third step of obtaining any one of the modal value, the average value, and the maximum value, of the first difference or first ratio in the pixel portion; and a fourth step of obtaining for each of the pixels a second difference or second ratio to specify a defective pixel, the second difference or second ratio being the difference or ratio between one of the first difference and the first ratio and any one of the modal value, average value, and maximum value obtained in the third step.

The image correcting method of the present invention is characterized by comprising:

a first step of inputting image signals read by a photoelectric conversion element;

a second step of obtaining the average value of image signals of pixels adjacent to a defective pixel;

a third step of setting the average value as an image signal of the defective pixel; and a fourth step of outputting the image signal of the defective pixel to a display device for displaying an image read by the photoelectric conversion element.

FIG. 1C shows a case in which an image of a subject is read by a semiconductor device that has the defective pixel specifying system and image correcting system of the present invention. As shown in FIG. 1D, the image signal of the pixel (m, n) is set based on the image signals of the pixels adjacent to the defective pixel. To elaborate, the image signal of the pixel (m, n) is changed from the initial 55 to 200. This correction makes the defective pixel 101 less conspicuous than in FIG. 1A.

Thus, a defective pixel can be made inconspicuous in a semiconductor device having a defective pixel by employing the present invention. The defective pixel seems as if it is repaired.

The present invention is effective for every semiconductor device that has an image sensor function. For example, the present invention is effective for CCD or CMOS type semiconductor devices having an image sensor function, and for any other types of semiconductor devices having an image sensor function as well. The present invention can work effectively in a line sensor and an area sensor. A semiconductor device for reading a monochromatic image and a semiconductor device for reading a color image both can employ the present invention effectively. The present invention is also effective for a semiconductor device formed on a single crystal (SOI or bulk) substrate and a semiconductor device having a thin film transistor.

The present invention can use all kinds of photoelectric conversion elements. A photoelectric conversion element often used is a PN photodiode. Also used are a PIN photodiode, an avalanche diode, an npn embedded diode, a Schottky diode, a phototransistor, an x-ray photoconductor, and an infrared sensor.

The present invention is also effective for a semiconductor device in which a pixel is composed of a photoelectric conversion element having a reading function and a display element for displaying an image read by the photoelectric conversion element. In this semiconductor device, the present invention is used when information of a subject read is displayed by the display element and makes it seem as if a defective pixel is repaired.

BRIEF DESCRIPTION OF THE DRAWINGS

In the accompanying drawings:

FIGS. 1A to 1D are diagrams illustrating the present invention;

DETAILED DESCRIPTION OF THE PREFERRED EMBODIMENTS

Embodiment Mode 1

Figure 2:
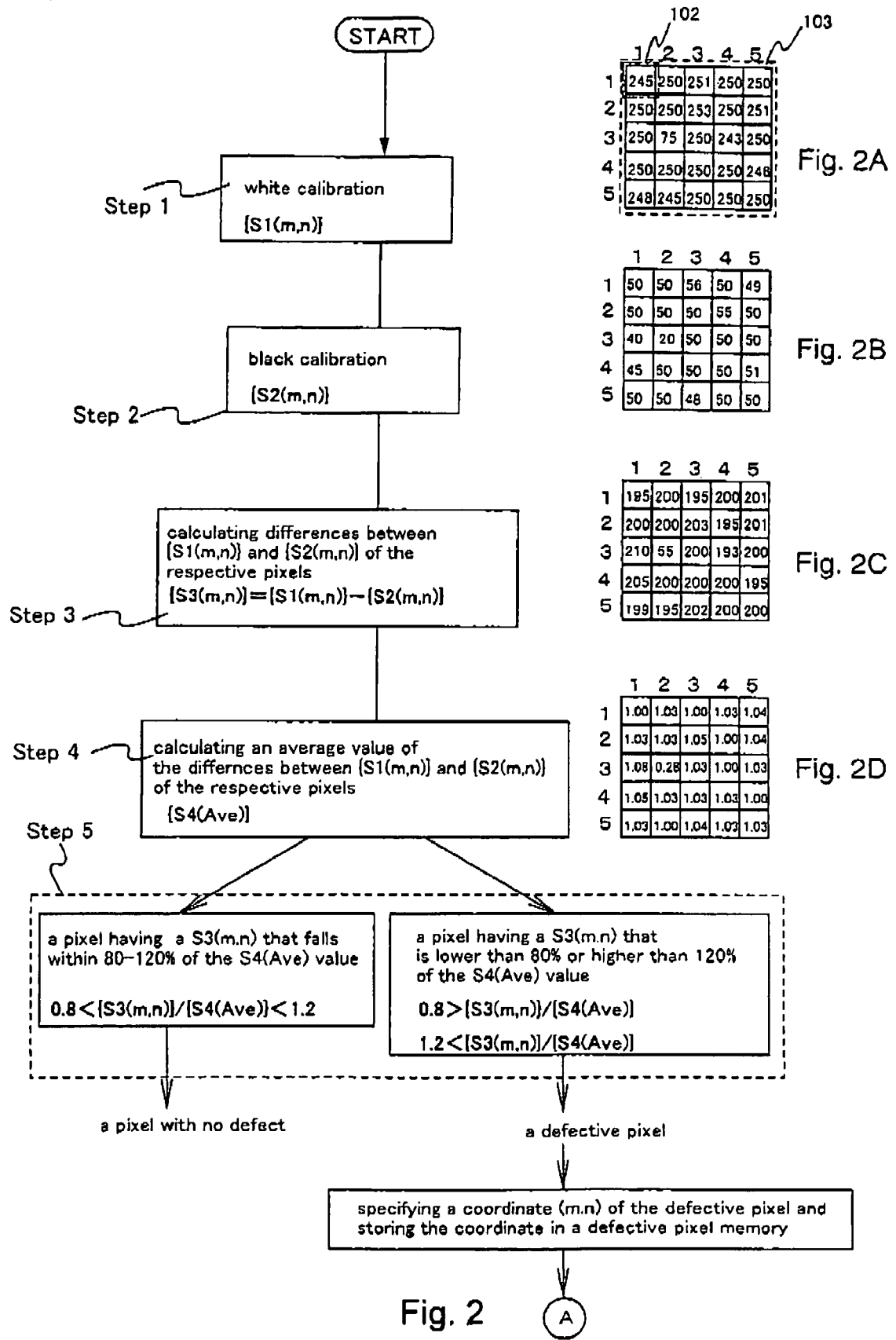
FIGS. 2A to 2D are schematic diagrams showing the concept of the present invention.

This embodiment mode describes means for determining whether there is a defective pixel and means for specifying the coordinate of the defective pixel in a defective pixel specifying method of the present invention. The description is given with reference to the flowchart of FIG. 2.

First, whether or not a pixel portion of a semiconductor device has a defective pixel is determined. The pixel portion reads at least two calibration sheets of different colors to decide. In general, a color is defined by three components; hue (corresponding to the wavelength of a single color light), chroma (vividness, namely, how small the proportion of white is), and brightness (the intensity of light). In this specification, a color may have merely one component or arbitrarily-selected two components out of the above three components. Step 1 of this embodiment consists of reading a white calibration sheet and Step 2 consists of reading a black calibration sheet. Step 3 involves obtaining the difference between image signal values obtained in Steps 1 and 2.

To simplify the explanation, a 5×5 pixel portion 103 is shown in FIGS. 2A to 2C to receive Steps 1 through 3. A pixel 102 is represented by a square and a number in each square represents its image signal. Numbers around the pixel portion 103 indicate coordinates of the pixels. FIG. 2A shows image signals of the respective pixels after the white calibration sheet is read. FIG. 2B shows image signals of the respective pixels after the black calibration sheet is read. An image signal value obtained in Step 1 is denoted by S1 (m, n). (m, n) represents a coordinate and, for example, S1(1, 1) corresponds to 245. An image signal value obtained in Step 2 is denoted by S2 (m, n). For example, S2(1, 1) corresponds to 50. In this embodiment mode, m and n both represent integers and respectively satisfy $1 \leq m \leq 5$ and $1 \leq n \leq 5$.

The white calibration sheet is used in Step 1 and the black calibration sheet is used in Step 2 in this embodiment mode. This is because a larger difference obtained is preferred in order to determine whether or not there is a defective pixel from the difference between an image signal value obtained in Step 1 and an image signal value obtained in Step 2. However, the present invention can use calibration sheets of any colors other than a white calibration sheet and a black calibration sheet as long as the sheets can produce a difference between an image signal value obtained in calibration of Step 1 and an image signal value obtained in calibration of Step 2 in the same pixel.

Although this embodiment mode reads two calibration sheets to determine whether there is a defective pixel, the number of calibration sheets is not limited to two. It is sufficient in the present invention if the presence or absence of a defective pixel is determined by reading at least two calibration sheets of different colors. However, when more than two calibration sheets are to be read, the difference between image signals is obtained for every set of two calibration sheets out of the plural calibration sheets. The difference values obtained are used to specify a defective pixel.

In Step 3, the difference between the image signal value obtained in Step 1 for each pixel and the image signal value obtained in Step 2 for each pixel is calculated. A number in a square representing one pixel 102 in FIG. 2C represents the difference calculated. The difference between an image signal value in Step 1 and an image signal value in Step 2 in the same pixel is expressed as S3(m, n). For example, S3(1, 1) corresponds to 195.

Step 4 is for obtaining the average value of differences between image signals of the respective pixels. First, S3(m, n) values of the pixels in the pixel portion 103 are summed up, and the obtained sum is divided by the number of pixels (25, in this embodiment mode). The average value obtained in Step 4 is expressed as S4(Ave). S4(Ave) is 193.8 for the pixel portion 103 shown in FIGS. 2A to 2C.

In Step 5, a S3(m, n) value of each pixel is compared with the S4(Ave) value, 193.8, obtained in Step 4. As shown in the following Expression 1, a pixel having a S3(m, n) value that falls within 80 to 120% of the S4(Ave) value, 193.8, is deemed as a pixel with no defect. As shown in the following Expressions 2 and 3, a pixel having S3(m, n) value that is lower than 80% or higher than 120% of the average value of 193.8 is deemed as a defective pixel.

Expression 1

$$0.8 \leq \{S3(m, n)\}/\{S4(\text{Ave})\} \leq 1.2 \quad (1)$$

Expression 2

$$0.8 > \{S3(m, n)\}/\{S4(\text{Ave})\} \quad (2)$$

Expression 3

$$1.2 < \{S3(m, n)\}/\{S4(\text{Ave})\} \quad (3)$$

In the pixel portion 103 shown in FIGS. 2A to 2C, the pixel (2, 3) is judged as a defective pixel. Simultaneously, the coordinate of the defective pixel, the pixel (2, 3), is stored in a defective pixel coordinate memory.

The difference between an image signal value in Step 1 and an image signal value in Step 2 is obtained for each pixel in Step 3 in this embodiment mode. However, the present invention is not limited thereto. For example, the sum of an image signal value in Step 1 and an image signal value in Step 2 may be obtained for each pixel in Step 3. Alternatively, the ratio or product of image signals in Steps 1 and 2 may be obtained for each pixel in Step 3.

Although the average value is calculated in Step 4, the present invention is not limited thereto. In Step 4, the maximum value may be obtained instead, or the modal value may be obtained on the histogram. A user may input a S4(Ave) value manually.

A pixel having a S3(m, n) value that falls within 80 to 120% of the S4(Ave) value is deemed as a pixel with no defect in Step 5 in this embodiment mode. However, the present invention is not limited thereto. A user can suitably determine how large a difference between the S3(m, n) value and the value obtained in Step 4 should be for a pixel to be deemed as a defective pixel. A defective pixel may be determined by a known statistical method using variance or standard deviation.

Preferably, calibration that is a measure to specify the coordinate of a defective pixel is conducted when the semiconductor device is used for the first time. Once the coordinate of a defective pixel is specified, the coordinate is stored in a defective pixel coordinate memory of the semiconductor device. Therefore, it is unnecessary to repeat calibration. If the coordinate of a defective pixel is already stored in the defective pixel coordinate memory, calibration is omitted and the process is started with reading an image of a subject at the point A in the flowcharts of FIGS. 2 and 3A.

Using the method described above, the present invention can readily determine whether there is a defective pixel and specify the coordinate of the defective pixel.

Embodiment Mode 2

This embodiment mode describes means for setting an image signal of a defective pixel in an image correcting method of the present invention. The description is given with reference to FIGS. 3A to 3C.

Figure 3A:
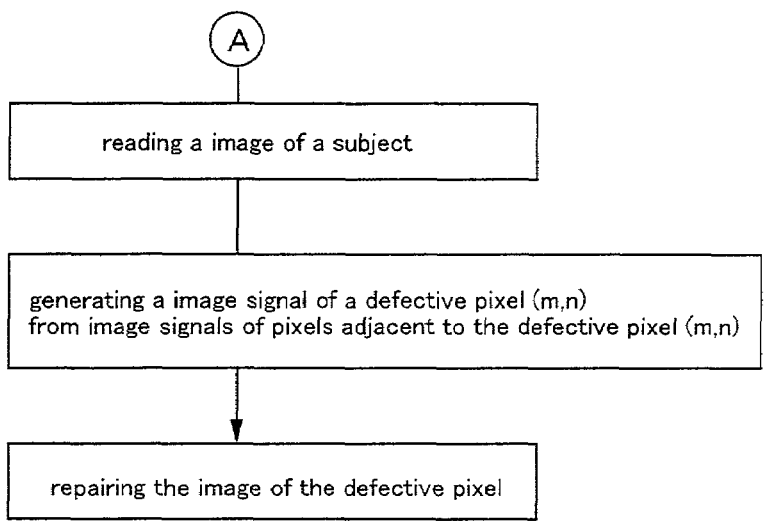
FIGS. 3A to 3C are schematic diagrams showing the concept of the present invention.

As shown in FIG. 3A, after the coordinate of a defective pixel 101 is specified and is stored in a defective pixel coordinate memory, an image signal of the defective pixel 101 is set based on image signals of pixels adjacent to the defective pixel.

Figure 3B:
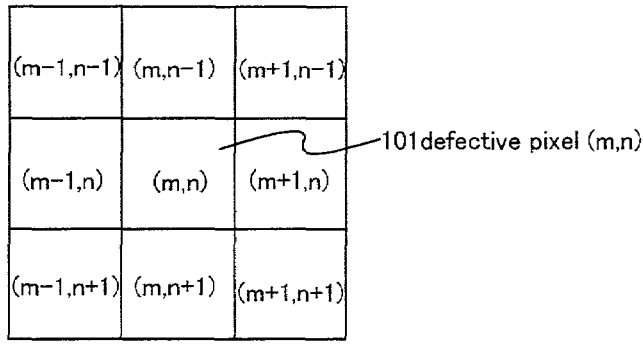

FIG. 3B shows a case in which a semiconductor device reads information of a subject in monochrome and displays a monochromatic image of the subject. If the coordinate of the defective pixel 101 is given as (m, n), pixels adjacent to the defective pixel 101 are pixels (m, n±1), pixels (m±1, n±1), and pixels (m±1, n), which are eight pixels in total. An image signal of the defective pixel is set based on image signals of these eight adjacent pixels. To elaborate, the average value of image signals of the pixels (m, n±1), pixels (m±1, n±1), and pixels (m±1, n) adjacent to the defective pixel 101 is obtained and set as an image signal of the defective pixel 101.

In FIG. 3B, the image signal of the defective pixel 101(m, n) is set based on the image signals of the pixels (m, n±1), pixels (m±1, n±1), and pixels (m±1, n), eight pixels in total. However, the present invention is not limited thereto. For instance, pixels (m±2, n±2) may be added to the above eight pixels to obtain the average value of image signals of twelve pixels in total. Alternatively, the average value of two pixels (m±1, n) to the right and left of the defective pixel 101, or the average value of two pixels (m, n±1) above and below the defective pixel 101, may be used. The defective pixel 101 may be set to have the same image signal as any one of the eight pixels (m, n±1), (m±1, n±1), and (m±1, n) adjacent to the defective pixel 101. In short, a user can appropriately choose pixels from those adjacent to a defective pixel to use the average value of image signals of the chosen pixels as an image signal of the defective pixel.

When a defective pixel is located at an end of pixel matrix, an image signal of the defective pixel may be set based only on an image signal of one adjacent pixel. If a semiconductor device has a first defective pixel and a second defective pixel next to each other, an image signal of the first defective pixel may be set based on image signals of pixels adjacent to the first defective pixel except the second defective pixel.

Figure 3C:
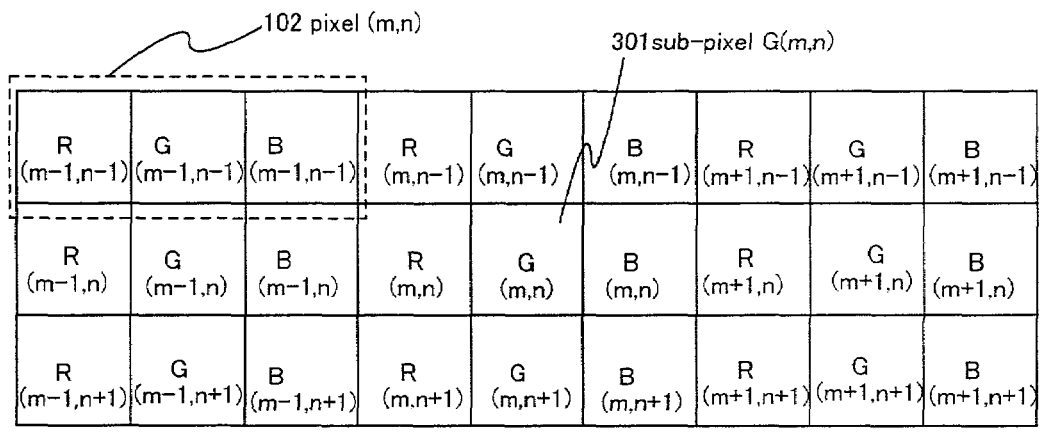

FIG. 3C shows a case in which a semiconductor device reads information of a subject in color and displays a color image of the subject. Roughly speaking, there are two methods of reading an image of a subject in color. One method includes providing a photoelectric conversion element in every pixel and switching light sources for red (R), green (G), and blue (B) three times to read a subject three times.

The other method includes providing three photoelectric conversion elements in every pixel, providing the device with red (R), green (G), and blue (B) color filters, and reading a subject once with light from a white light source. This method is further divided into a case in which one color filter is provided in one pixel and information of other colors are supplied from the adjacent pixels, and a case in which one pixel is divided into three sub-pixels and red (R), green (G), and blue (B) color filters are respectively provided in the sub-pixels. The second case of the latter method is described in this embodiment mode.

Reference numeral 102 denotes a pixel, which has a sub-pixel R (m−1, n−1), a sub-pixel G (m−1, n−1), and a sub-pixel B (m−1, n−1). If the coordinate of a defective sub-pixel 301 is given as (m, n), sub-pixels surrounding the defective sub-pixels are sub-pixels G (m, n±1), sub-pixels G (m±1, n±1), and sub-pixels G (m±1, n), eight sub-pixels in total. An image signal of the defective sub-pixel 301 is set based on image signals of these eight adjacent sub-pixels. To elaborate, the average value of image signals of the sub-pixels G (m, n±1), sub-pixels G (m±1, n±1), and sub-pixels G (m±1, n) surrounding the defective sub-pixel 301 is obtained and set as an image signal of the defective sub-pixel 301.

In FIG. 3C, the image signal of the defective sub-pixel 301 (m, n) is set based on the image signals of the sub-pixels G (m, n±1), sub-pixels G (m±1, n±1), and sub-pixels G (m±1, n), eight sub-pixels in total. However, the present invention is not limited thereto. For instance, sub-pixels G (m±2, n±2) may be added to the above eight sub-pixels to obtain the average value of image signals of twelve sub-pixels in total. Alternatively, the average value of two sub-pixels G (m±1, n) may be used. In short, a user can appropriately choose sub-pixels from those adjacent to a defective sub-pixel to use the average value of image signals of the chosen sub-pixels as an image signal of the defective sub-pixel. Correction of an image of a subject using the present invention may be made after data of the subject corresponding to the entire screen are read. Alternatively, an image of a subject may be corrected each time reading one row or one pixel of information of the subject is completed.

Using the method described above, the present invention can readily set an image signal of a defective pixel. As a result, the defective pixel seems as if it is repaired.

This embodiment mode may be combined freely with Embodiment Mode 1.

Embodiment Mode 3

This embodiment mode describes the relation between a pixel portion with a plurality of pixels each having a photoelectric conversion element and a display device for displaying an image of a subject read by the pixel portion. The description is given with reference to FIG. 4.

Figure 4:
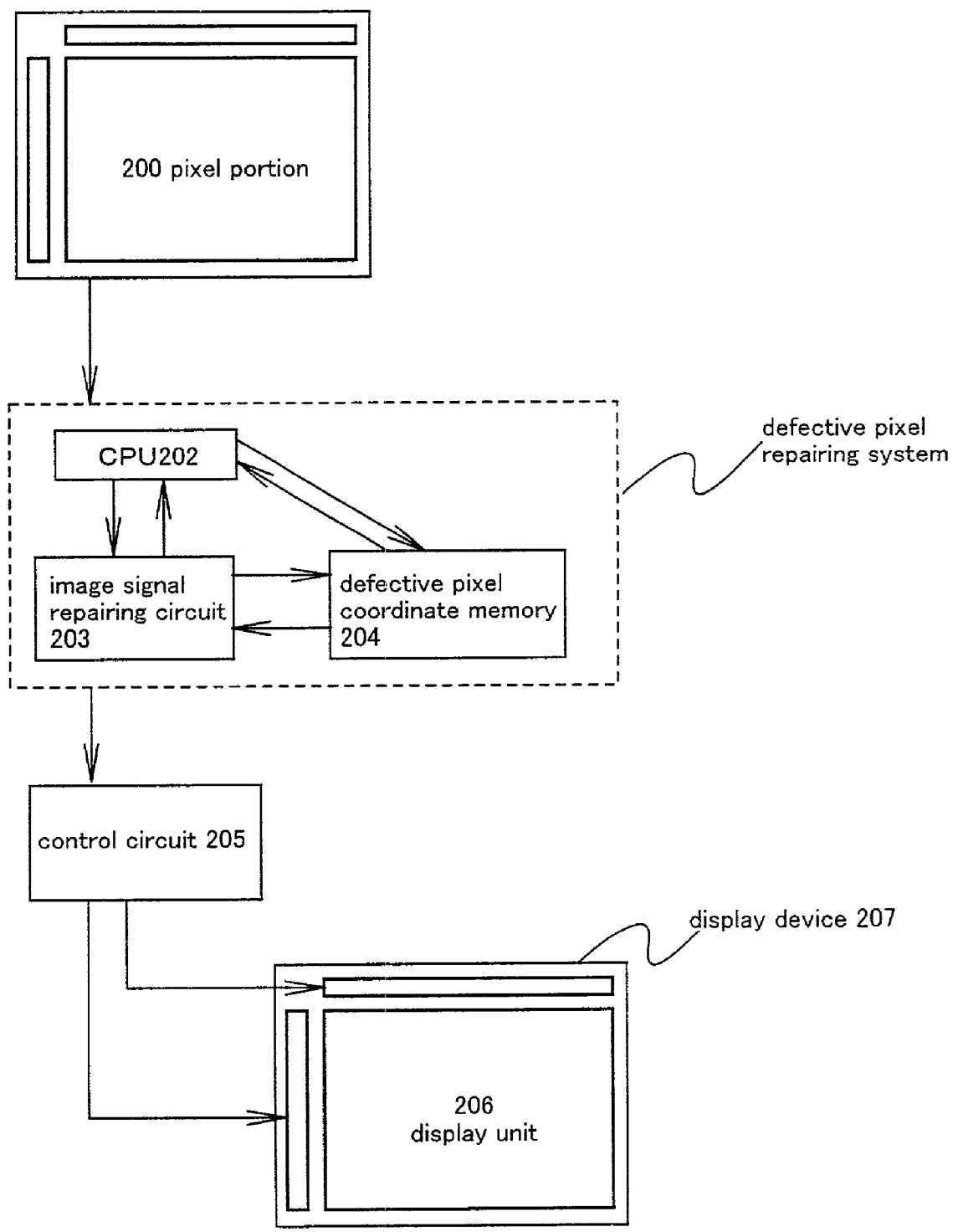
FIG. 4 is a schematic diagram showing the concept of the present invention.

In FIG. 4, a pixel portion 200 is provided with a photoelectric conversion element having a reading function. Information of a subject read by the pixel portion 200 is outputted to a defective pixel repairing system. In this embodiment mode, a defective pixel specifying system and an image correcting system are collectively called a defective pixel repairing system.

The defective pixel repairing system has a CPU 202, an image signal repairing circuit 203, and a defective pixel coordinate memory 204. The defective pixel repairing system of the present invention has means for determining whether there is a defective pixel in the pixel portion through calibration and for specifying the coordinate of the defective pixel. The system is also characterized by having means for setting an image signal of the defective pixel based on image signals of pixels adjacent to the defective pixel.

Once the coordinate of a defective pixel is specified, the defective pixel coordinate memory 204 stores the coordinate of the defective pixel. The image signal repairing circuit 203 sets an image signal of the defective pixel based on image signals of pixels adjacent to the defective pixel. To elaborate, the average value of image signals of pixels adjacent to the defective pixel is obtained to set the average value as an image signal of the defective pixel.

A control circuit 205 outputs the image signal of the defective pixel, which is set by the defective pixel repairing system, and image signals of other pixels than the defective pixel to a display unit 206. The display unit 206 displays the image of the subject read by the pixel portion 200.

The present invention is effective for every semiconductor device that has an image sensor function. For example, the present invention is effective for CCD or CMOS type semiconductor devices having an image sensor function, and for any other types of semiconductor devices having an image sensor function as well. The present invention can work effectively in a line sensor and an area sensor. A semiconductor device for reading a monochromatic image and a semiconductor device for reading a color image both can employ the present invention effectively. The present invention is also effective for a semiconductor device formed on a single crystal (SOI or bulk) substrate and a semiconductor device having a thin film transistor.

In the case of a semiconductor device having a reading function alone, such as a scanner, the present invention is employed to display an image with an arbitrarily-chosen display device while making a defective pixel seem as if it is repaired. When information of a subject read by a scanner is to be displayed with an arbitrarily-chosen display device, the pixel portion 200 and the display unit 206 shown in FIG. 4 are separate devices.

In a semiconductor device in which one pixel is composed of a photoelectric conversion element and a light emitting element, the same pixel conducts both reading information of a subject and displaying the subject. In a semiconductor device as this, the pixel portion 200 and the display unit 206 shown in FIG. 4 are one device.

This embodiment mode may be combined freely with Embodiment Modes 1 and 2.

Embodiment 1

This embodiment describes an example of a semiconductor device to which the present invention can be applied.

Figure 5:
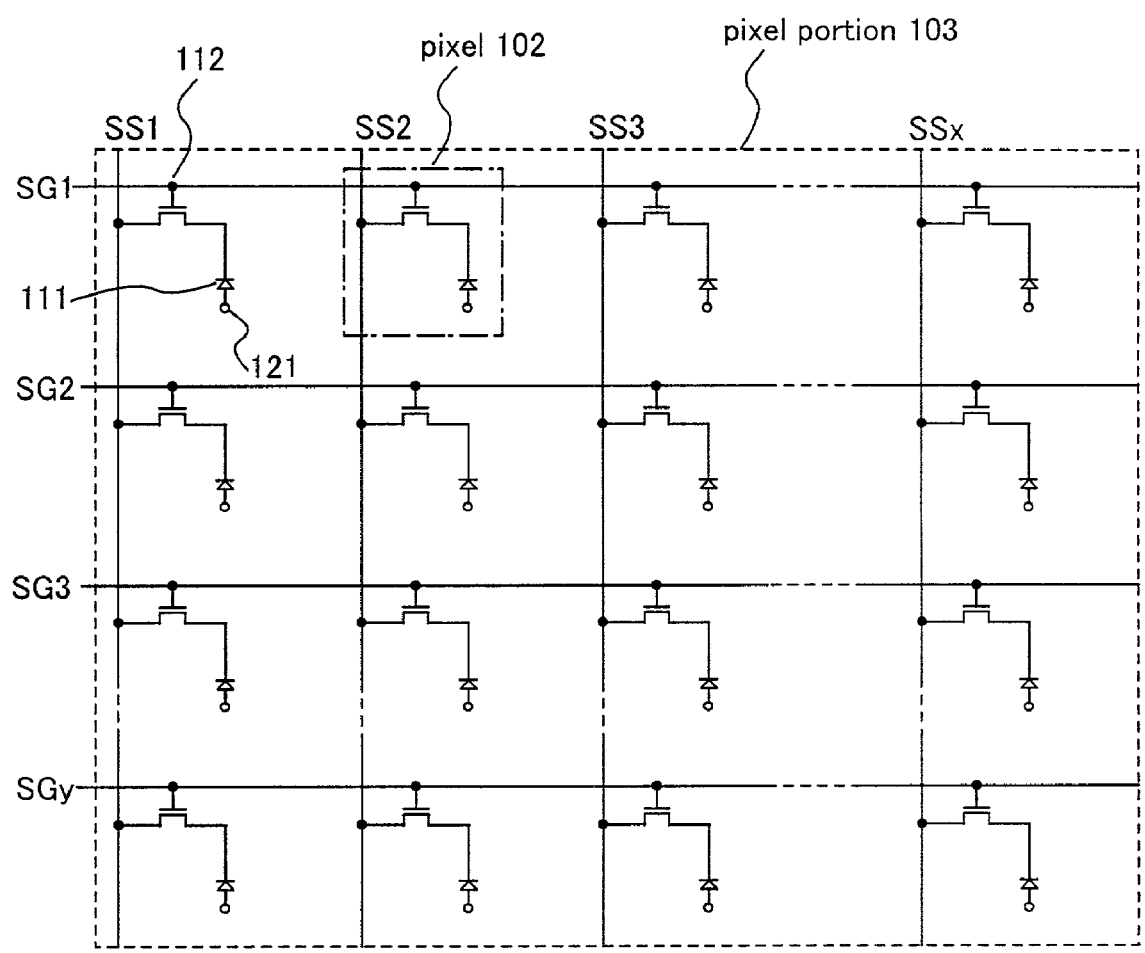
FIG. 5 is a circuit diagram of a semiconductor device to which the present invention can be applied.

FIG. 5 is a circuit diagram of a pixel portion in a passive semiconductor device. A pixel portion 103 has sensor selecting signal lines (SG1 to SGy) and sensor signal output lines (SS1 to SSx).

The pixel portion 103 has a plurality of pixels 102. Each of the pixels 102 has a photodiode 111, a sensor selecting transistor 112, one of the sensor selecting signal lines (SG1 to SGy), and one of the sensor signal output lines (SS1 to SSx).

A P channel side terminal of the photodiode 111 is connected to a power supply reference line 121. The sensor selecting transistor 112 has a source region and a drain region one of which is connected to an N channel side terminal of the photodiode 111 and the other of which is connected to the sensor signal output line (one of SS1 to SSx). A gate electrode of the sensor selecting transistor 112 is connected to the sensor selecting signal line (one of SG1 to SGy).

When the pixel portion 103 of the semiconductor device shown in FIG. 5 has a defective pixel, the present invention is applied to make the defective pixel seem as if it is repaired.

This embodiment may be combined freely with Embodiment Modes 1 through 3.

Embodiment 2

This embodiment describes a semiconductor device different from the one in Embodiment 1.

Figure 6:
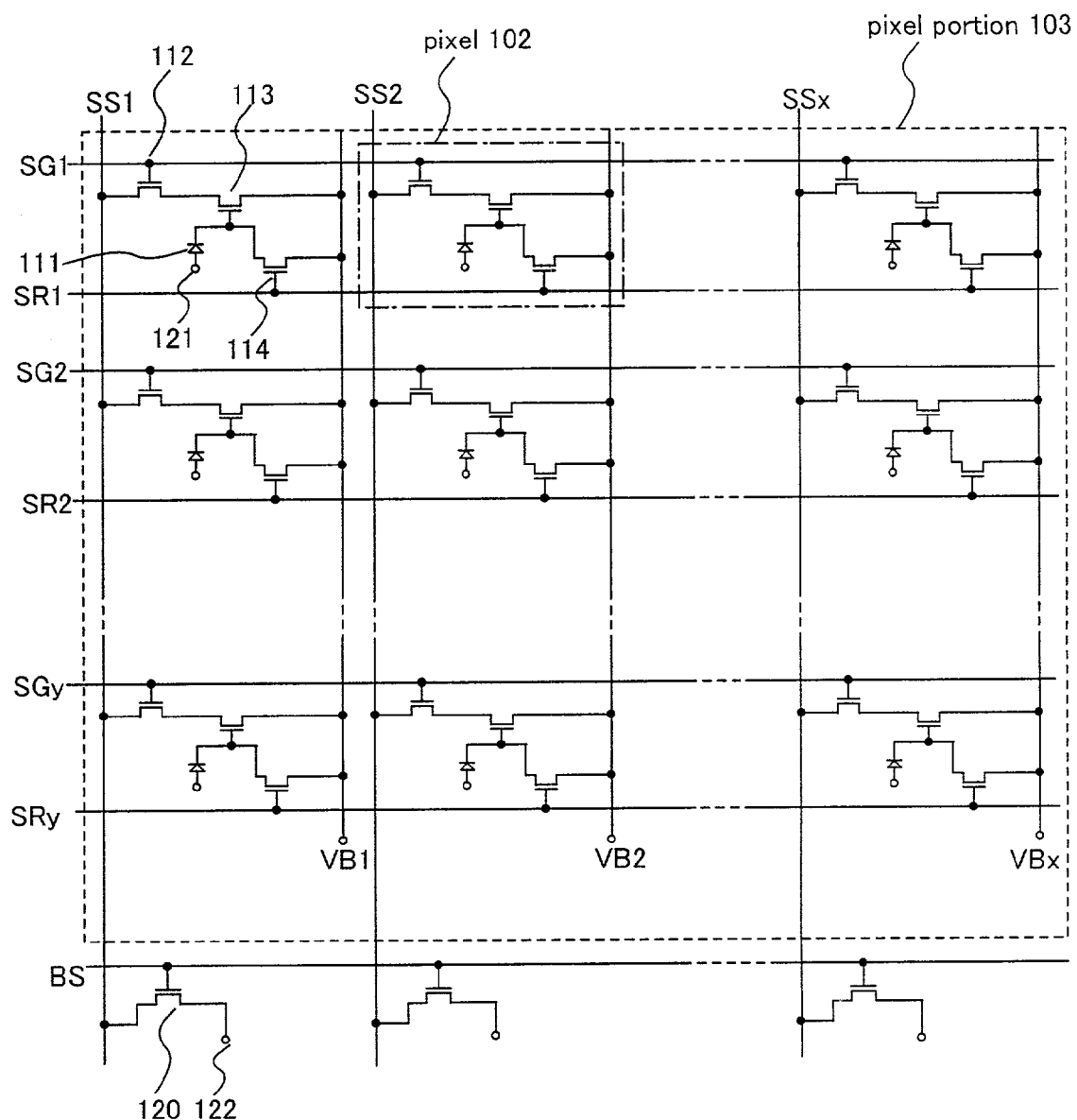
FIG. 6 is a circuit diagram of a semiconductor device to which the present invention can be applied.

FIG. 6 is a circuit diagram of a pixel portion in an active semiconductor device. A pixel portion 103 has sensor selecting signal lines (SG1 to SGy), sensor resetting signal lines (SR1 to SRy), sensor signal output lines (SS1 to SSx), and sensor power supply lines (VB1 to VBx).

The pixel portion 103 has a plurality of pixels 102. Each of the pixels 102 has a photodiode 111, a sensor selecting transistor 112, an amplifying transistor 113, a sensor resetting transistor 114, one of the sensor selecting signal lines (SG1 to SGy), one of the sensor resetting signal lines (SR1 to SRy), one of the sensor signal output lines (SS1 to SSx), and one of the sensor power supply lines (VB1 to VBx).

A P channel side terminal of the photodiode 111 is connected to a power supply reference line 121. An N channel side terminal of the photodiode 111 is connected to a gate electrode of the amplifying transistor 113.

The amplifying transistor 113 has a drain region and a source region one of which is connected to the sensor power supply line (one of VB1 to VBx) and the other of which is connected to a drain region of the sensor selecting transistor 112. The amplifying transistor 113 and a bias transistor 120 together make a source follower circuit. Accordingly, it is desirable for the amplifying transistor 113 and the bias transistor 120 to have the same polarity.

A gate electrode of the sensor selecting transistor 112 is connected to the sensor selecting signal line (one of SG1 to SGy). A source region of the sensor selecting transistor 112 is connected to the sensor signal output line (one of SS1 to SSx).

A gate electrode of the sensor resetting transistor 114 is connected to the sensor resetting signal line (one of SR1 to SRy). The sensor resetting transistor 114 has a source region and a drain region one of which is connected to the sensor power supply line (one of VB1 to VBx) and the other of which is connected to the gate electrode of the amplifying transistor 113.

The bias transistor 120 has a source region and a drain region one of which is connected to the sensor signal output line (one of SS1 to SSx) and the other of which is connected to a power supply line 122. A gate electrode of the bias transistor 120 is connected to a bias signal line (BS).

When the pixel portion 103 of the semiconductor device shown in FIG. 6 has a defective pixel, the present invention is applied to make the defective pixel seem as if it is repaired.

The descriptions given in Embodiments 1 and 2 are about CMOS type semiconductor devices. However, the present invention is also applicable to CCD type semiconductor devices. This embodiment may be combined freely with Embodiment Modes 1 through 3 and Embodiment 1.

Embodiment 3

This embodiment describes an example different from the ones in Embodiments 1 and 2. A semiconductor device described in this embodiment has a light emitting element and a photoelectric conversion element in one pixel. The description is given with reference to FIGS. 7 and 8.

A pixel portion 103 has source signal lines (S1 to Sx), power supplying lines (V1 to Vx), selecting signal lines (EG1 to EGy), resetting signal lines (ER1 to ERy), sensor selecting signal lines (SG1 to SGy), sensor resetting signal lines (SR1 to SRy), sensor signal output lines (SS1 to SSx), and sensor power supply lines (VB1 to VBx).

The pixel portion 103 has a plurality of pixels 102. Each of the pixels 102 has one of the source signal lines (S1 to Sx), one of the power supplying lines (V1 to Vx), one of the selecting signal lines (EG1 to EGy), one of the resetting signal lines (ER1 to ERy), one of the sensor selecting signal lines (SG1 to SGy), one of the sensor resetting signal lines (SR1 to Sry) one of the sensor signal output lines (SS1 to SSx), and one of the sensor power supply lines (VB1 to VBx). Each of the pixels 102 also has a selecting transistor 116, a driving transistor 119, a resetting transistor 117, a sensor selecting transistor 112, an amplifying transistor 113, and a sensor resetting transistor 114.

A bias transistor 120 has a source region and a drain region one of which is connected to the sensor signal output line (one of SS1 to SSx) and the other of which is connected to a power supply line 122. A gate electrode of the bias transistor 120 is connected to a bias signal line (BS).

Figure 8:
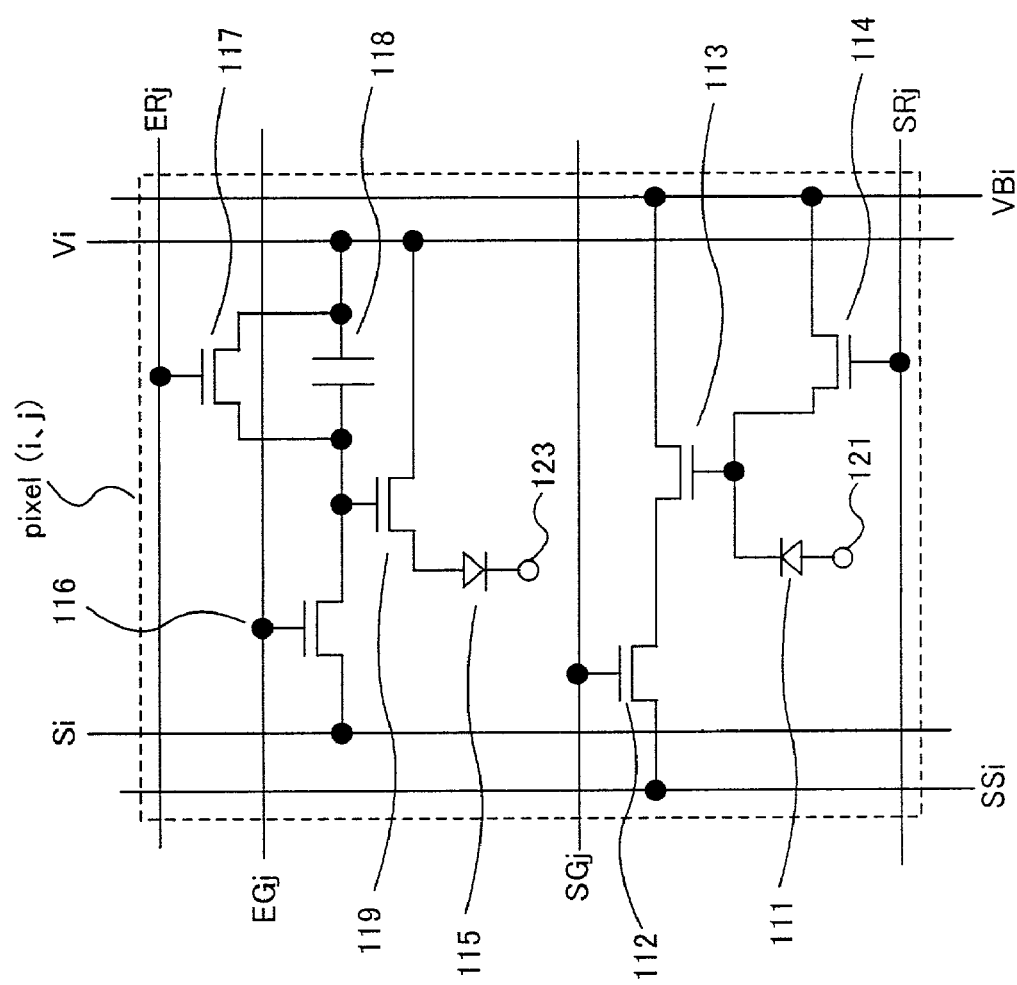
FIG. 8 is a circuit diagram of a pixel in a semiconductor device to which the present invention can be applied.

FIG. 8 shows a pixel (i, j) located at Row i and Column j in the pixel portion of FIG.

The photodiode 111 has an n-channel terminal, a p-channel terminal, and a photoelectric conversion layer that is placed between the n-channel terminal and the p-channel terminal. One of the n-channel terminal and the p-channel terminal is connected to a power supply reference line 121 and the other is connected to a gate electrode of the amplifying transistor 113.

A gate electrode of the sensor selecting transistor 112 is connected to the sensor selecting signal line (SGj). The sensor selecting transistor 112 has a source region and a drain region one of which is connected to a source region of the amplifying transistor 113 and the other of which is connected to the sensor signal output line (SSi). The sensor selecting transistor 112 is a transistor functioning as a switching element when a signal of the photodiode 111 is outputted.

A drain region of the amplifying transistor 113 is connected to the sensor power supply line (VBi). The source region of the amplifying transistor 113 is connected to the source region or drain region of the sensor selecting transistor 112. The amplifying transistor 113 and the bias transistor 120 together make a source follower circuit. Accordingly, it is desirable for the amplifying transistor 113 and the bias transistor 12() to have the same polarity.

A gate electrode of the sensor resetting transistor 114 is connected to the sensor resetting signal line (SRj). The sensor resetting transistor 114 has a source region and a drain region one of which is connected to the sensor power supply line (VBi) and the other of which is connected to the photodiode 111 and to the gate electrode of the amplifying transistor 113. The sensor resetting transistor 114 is a transistor functioning as an element for initializing the photodiode 111.

A light emitting element 115 has an anode, a cathode, and an organic compound layer that is placed between the anode and the cathode. When the anode is connected to a source region or drain region of the driving transistor 119, the anode serves as a pixel electrode whereas the cathode serves as an opposite electrode. On the other hand, the cathode serves as the pixel electrode and the anode serves as the opposite electrode when the cathode is connected to the source region or drain region of the driving transistor 119.

A gate electrode of the selecting transistor 116 is connected to the selecting signal line (EGj). The selecting transistor 116 has a source region and a drain region one of which is connected to the source signal line (Si) and the other of which is connected to a gate electrode of the driving transistor 119. The selecting transistor 116 is a transistor functioning as a switching element when a signal is written in the pixel (i, j).

One of the source region and drain region of the driving transistor 119 is connected to the power supplying line (Vi) and the other is connected to the light emitting element 115. A capacitor 118 is connected to the gate electrode of the driving transistor 119 and to the power supplying line (Vi). The driving transistor 119 is a transistor functioning as a current controlling element, namely, an element for controlling a current supplied to the light emitting element 115.

The resetting transistor 117 has a source region and a drain region one of which is connected to the power supplying line (Vi) and the other of which is connected to the gate electrode of the driving transistor 119. A gate electrode of the resetting transistor 117 is connected to the resetting signal line (ERj). The resetting transistor 117 is a transistor functioning as an element for erasing (resetting) a signal written in the pixel (i, j).

The semiconductor device of the present embodiment has a plurality of transistors for controlling the photoelectric conversion element and transistors for controlling the light emitting element. Information of a subject read by the photoelectric conversion element is displayed by the light emitting element provided in the same pixel.

A defective pixel as defined in this specification is a pixel in which a photoelectric conversion element having a reading function or a transistor for controlling the photoelectric conversion element has a defect. If such a pixel has a light emitting element and a transistor for controlling the light emitting element that are not defective, the present invention can be applied to this pixel.

Figure 7:
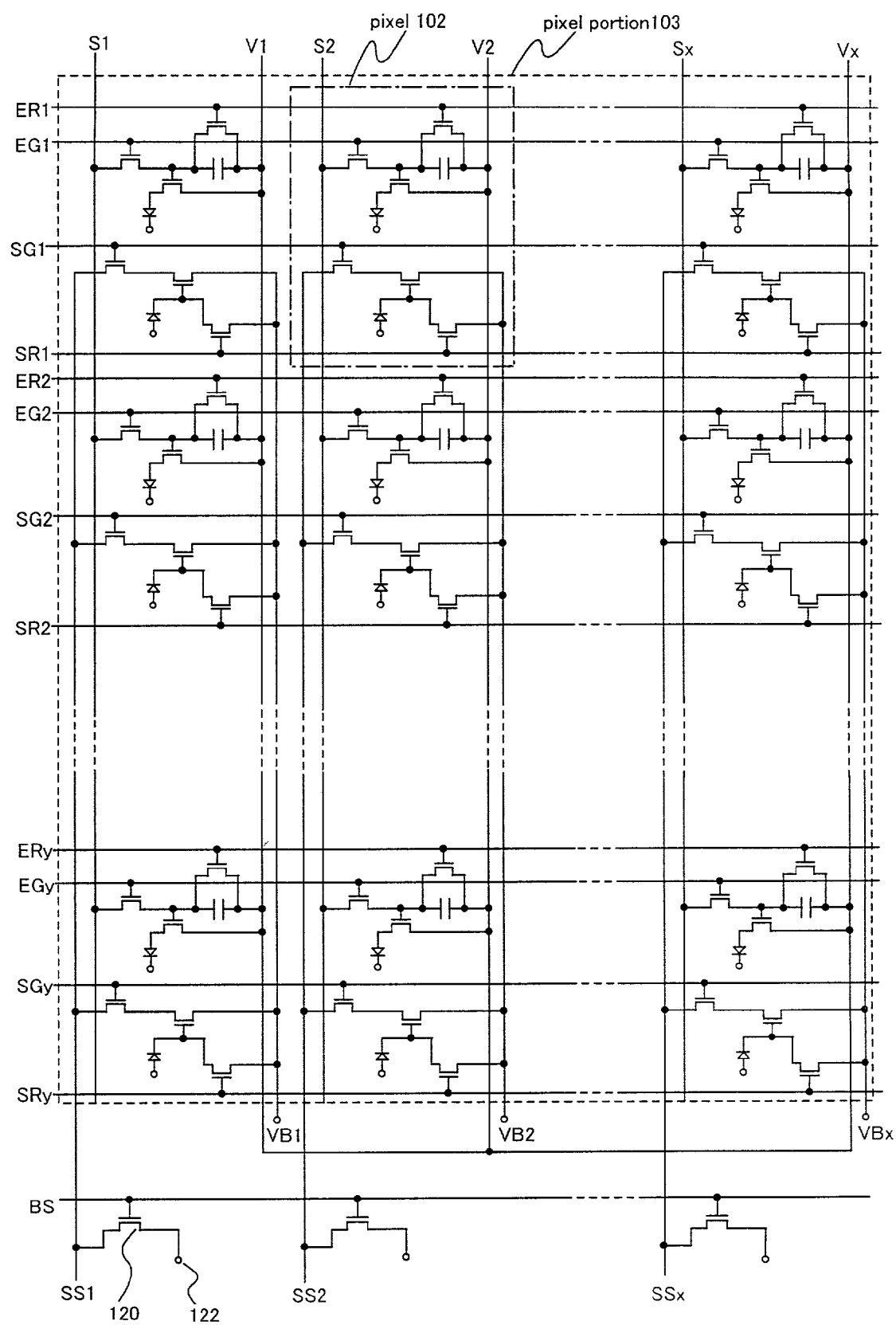
FIG. 7 is a circuit diagram of a semiconductor device to which the present invention can be applied.

When the pixel portion 103 of the semiconductor device shown in FIG. 7 has a defective pixel, the present invention is applied to make the defective pixel seem as if it is repaired.

This embodiment may be combined freely with Embodiment Modes 1 through 3 and Embodiments 1 and 2.

Embodiment 4

Figure 16:
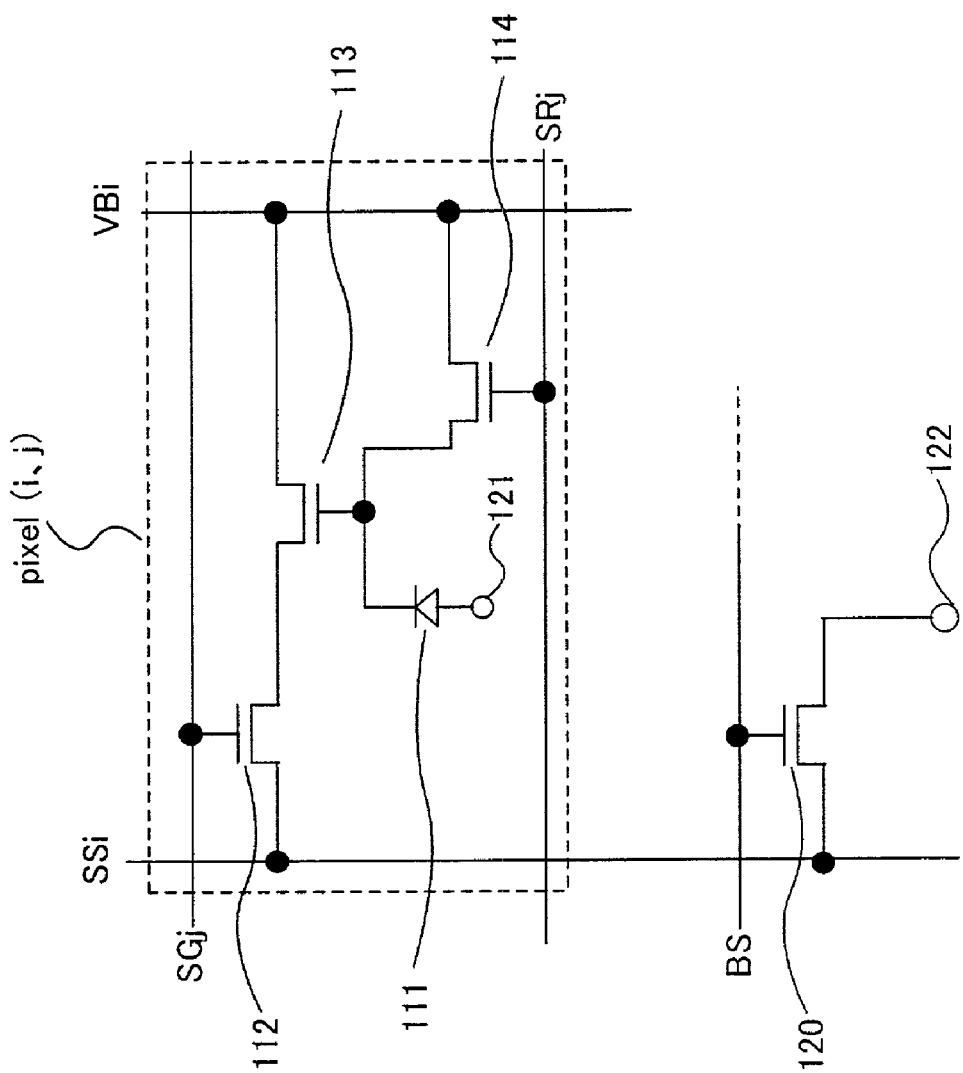
FIG. 16 is a circuit diagram of a pixel in a semiconductor device to which the present invention can be applied.

This embodiment gives a brief description on operation of the active CMOS sensor semiconductor device described in Embodiment 2. FIG. 16 shows a pixel (i, j) located at Row i and Column j in the pixel portion 103 of FIG. 6.

In the pixel (i, j) shown in FIG. 16, first, the sensor resetting transistor 114 is turned conductive. As the sensor resetting transistor 114 is turned conductive, the p-channel terminal of the photoelectric conversion element 111 is connected to the power supply reference line 121 and the n-channel terminal of the photoelectric conversion element 111 is electrically connected to the sensor power supply line (VBi). At this point, the electric potential of the power supply reference line 121 is at a reference electric potential 0 V and the electric potential of the sensor power supply line (VBi) is at a power supply electric potential Vdd. Accordingly, a reverse bias voltage is given to the photoelectric conversion element 111. In this specification, a charging operation in which the electric potential of the n-channel terminal of the photoelectric conversion element 111 is raised to the level of the electric potential of the sensor power supply line (VBi) is called a reset operation.

Next, the sensor resetting transistor 114 is turned unconductive. With the sensor resetting transistor 114 being unconductive, the photoelectric conversion element 111 generates electric charges through photoelectric conversion if the photoelectric conversion element 111 is irradiated with light. Therefore, the electric potential of the n-channel terminal of the photoelectric conversion element 111, which has been raised to the level of the electric potential of the sensor power supply line (VBi), is gradually lowered with time.

After allowing a certain period of time to pass, the sensor selecting transistor 112 is turned conductive. As the sensor selecting transistor 112 is turned conductive, the electric potential of the n-channel terminal of the photoelectric conversion element 111 is outputted to the sensor signal output line (SSi) through the amplifying transistor 113.

However, while the electric potential of the n-channel terminal of the photoelectric conversion element 111 is outputted to the sensor signal output line (SSi), an electric potential is given to the bias signal line (BS). That means a current is flowing in the bias transistor 120 during this and therefore the amplifying transistor 113 and the bias transistor 120 are functioning as a source follower circuit.

The wiring line to which the p-channel terminal of the photoelectric conversion element 111 is connected in FIG. 16, namely, the power supply reference line 121 may also be called a photoelectric conversion element side power supply line. The electric potential of the photoelectric conversion element side power supply line changes depending on how the photoelectric conversion element 111 is aligned. In FIG. 16, the photoelectric conversion element side power supply line is connected to the p-channel terminal of the photoelectric conversion element 111 and has the reference electric potential 0 V. This is why the photoelectric conversion element side power supply line is called as a power supply reference line in FIG. 16.

Similarly, the wiring line to which the sensor resetting transistor 114 is connected in FIG. 16, namely, the sensor power supply line (VBi) may also be called a reset side power supply line. The electric potential of the reset side power supply line changes depending on how the photoelectric conversion element 111 is aligned. In FIG. 16, the reset side power supply line is connected to the n-channel terminal of the photoelectric conversion element 111 through the sensor resetting transistor 114 and has the power supply electric potential Vdd. This is why the reset side power supply line is called as a power supply line in FIG. 16.

The operation of resetting the photoelectric conversion element 111 is identical with the operation of giving the photoelectric conversion element 111 a reverse bias voltage. Accordingly, which of the photoelectric conversion element side power supply line and the reset side power supply line has a higher electric potential changes depending on how the photoelectric conversion element 111 is aligned.

Figure 17:
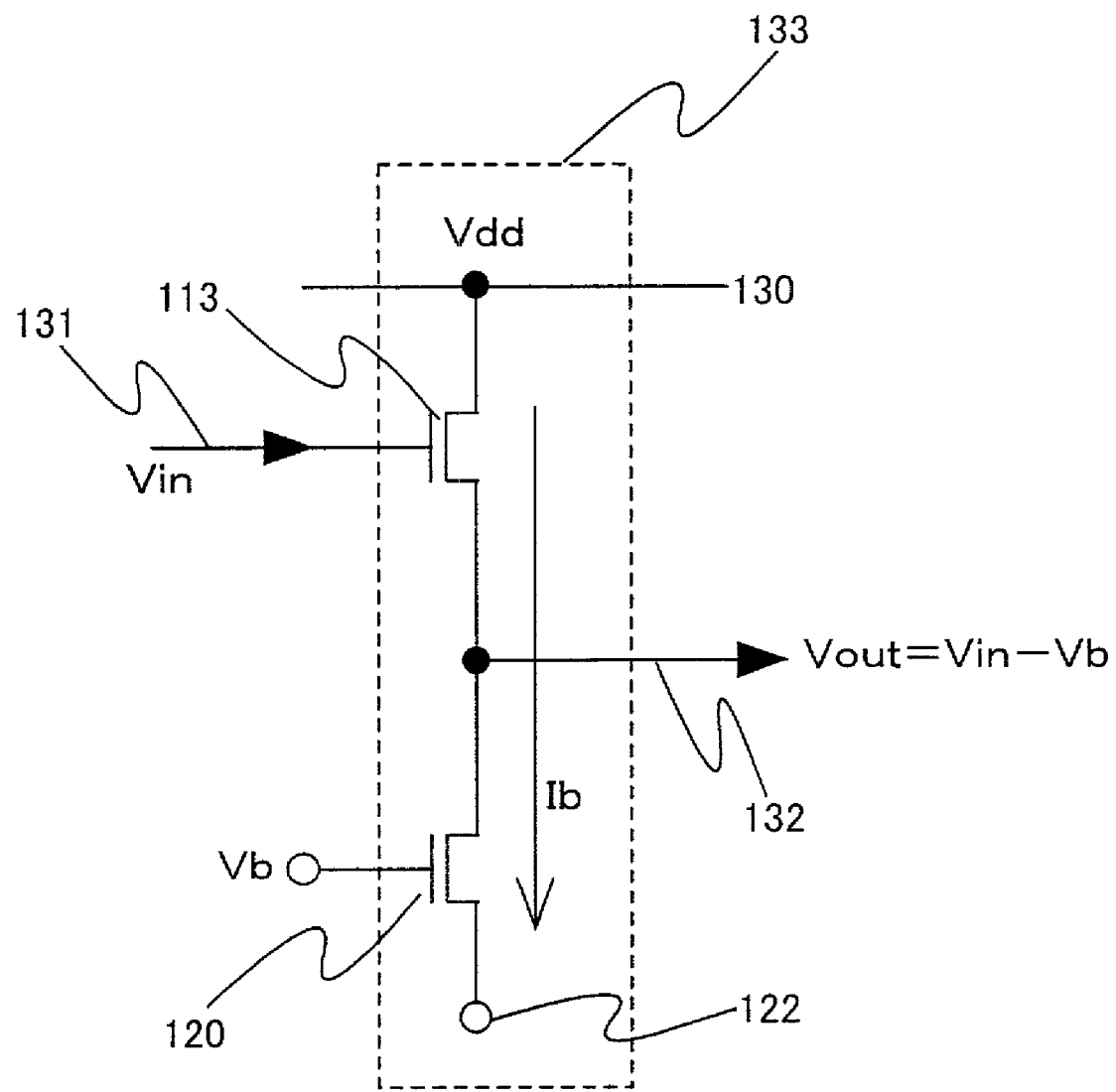
FIG. 17 is a circuit diagram of a pixel in a semiconductor device to which the present invention can be applied.

Next, an example of a basic source follower circuit is shown in FIG. 17 and the operation thereof is described below. The example shown in FIG. 17 uses n-channel transistors but p-channel transistors may be used to constitute the source follower circuit.

An amplifier side power supply line 130 receives the power supply electric potential Vdd and the power supply line 122 receives the reference electric potential 0 V The drain region of the amplifying transistor 113 is connected to the amplifier side power supply line 130 and the source region of the amplifying transistor 113 is connected to the drain region of the bias transistor 120. The source region of the bias transistor 120 is connected to the power supply line 122.

The gate electrode of the bias transistor 120 receives a bias electric potential Vb and a bias current Ib flows in the bias transistor 120. The bias transistor 120 operates as a constant current supply.

In FIG. 17, the gate electrode of the amplifying transistor 113 serves as an input terminal 131. Therefore an input electric potential Vin is applied to the gate electrode of the amplifying transistor 113. The source region of the amplifying transistor 113 serves as an output terminal 132. Therefore an output electric potential Vout is the electric potential of the source region of the amplifying transistor 113. The input/output electric potential of the source follower circuit satisfies Vout=Vin–Vb.

In FIG. 17, it is assumed that the sensor selecting transistor 112 is conductive and the transistor 112 is omitted from the drawing. The electric potential of the n-channel terminal of the photoelectric conversion element 111 corresponds to the input electric potential Vin (the gate electric potential of the amplifying transistor 113, namely, the electric potential of the input terminal 131). The electric potential of the sensor signal output line (SSi) corresponds to the output electric potential Vout (the source electric potential of the amplifying transistor 113, namely, the electric potential of the output terminal 132). The sensor power supply line (VBi) corresponds to the amplifier side power supply line 130.

Accordingly, in FIG. 16, the electric potential of the n-channel terminal of the photoelectric conversion element 111 is Vpd, the electric potential of the bias signal line (BS), namely, the bias electric potential, is Vb, and the electric potential of the sensor signal output line (SSi) is Vout. When the power supply reference line 121 and the power supply line 122 have an electric potential of 0 V, Vout=Vpd–Vb. Therefore Vout changes as the electric potential Vpd of the n-channel terminal of the photoelectric conversion element 111 changes, outputting as a signal the change in Vpd. This allows the photoelectric conversion element 111 to read intensity of light.

Figure 18:
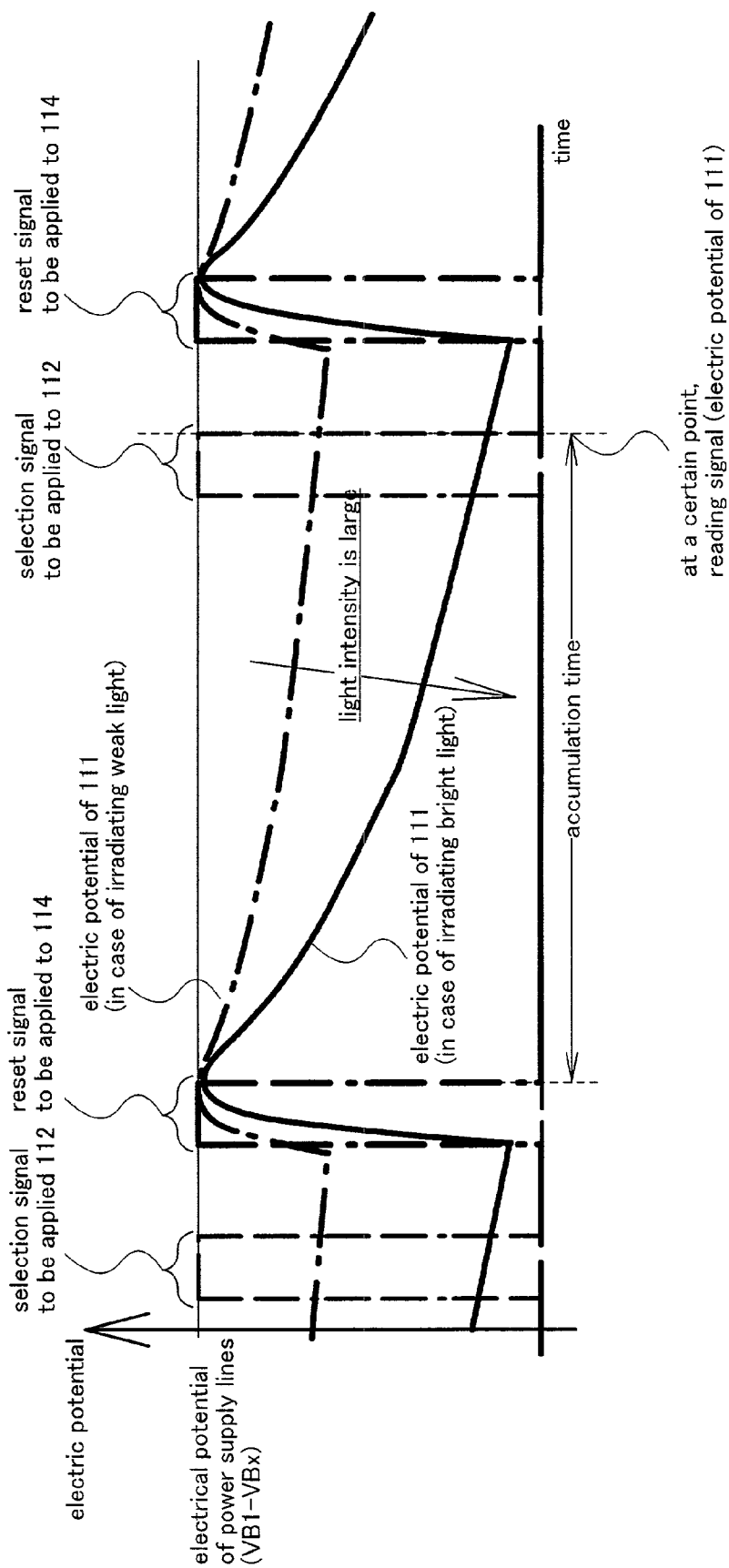
FIG. 18 is a diagram showing an operation mode of a semiconductor device to which the present invention can be applied.

The description given next with reference to the timing chart of FIG. 18 is about a selecting signal, a resetting signal, and a signal red by the photoelectric conversion element in each of the pixels 102.

First, the sensor resetting signal line (one of SR1 to SRy) is controlled to turn the sensor resetting transistor 114 conductive.

Next, the n-channel terminal of the photoelectric conversion element 111 is charged until its electric potential reaches the level of the electric potential of the sensor power supply line (one of VB1 to VBx), namely, the power supply electric potential Vdd. In other words, the pixel is reset. Then the sensor resetting signal line (one of SR1 to SRy) is controlled to turn the sensor resetting transistor 114 unconductive.

Thereafter the photoelectric conversion element 111 generates electric charges in an amount according to the intensity of light if the photoelectric conversion element 111 is irradiated with light. The electric charges charged by reset operation are gradually discharged to lower the electric potential of the n-channel terminal of the photoelectric conversion element 111.

As shown in FIG. 18, when the photoelectric conversion element 111 is irradiated with bright light, a large amount of electric charges are discharged to lower the electric potential of the n-channel terminal of the photoelectric conversion element 111. When the photoelectric conversion element 111 is irradiated with weak light, a small amount of electric charges are discharged and therefore the electric potential of the n-channel terminal of the photoelectric conversion element 111 is lowered less than in the case where the element is irradiated with bright light.

Then at one point, the sensor selecting transistor 112 is turned conductive to read as a signal the electric potential of the n-channel terminal of the photoelectric conversion element 111. The signal is in proportion to the intensity of light that irradiates the photoelectric conversion element 111. The sensor resetting transistor 114 is again turned conductive to reset the photoelectric conversion element 111 and repeat the operations described above.

If the photoelectric conversion element 111 is irradiated with too bright light, a very large amount of electric charges thereof are discharged to greatly lower the electric potential of the n-channel terminal of the photoelectric conversion element 111. However, the electric potential of the n-channel terminal of the photoelectric conversion element 111 is never reduced to a level lower than the electric potential of the p-channel terminal of the photoelectric conversion element 111, namely, the electric potential of the power supply reference line 121.

When the electric potential of the n-channel terminal of the photoelectric conversion element 111 is reduced due to irradiation of very bright light, the electric potential stops lowering once it reaches the level of the electric potential of the power supply reference line 121. This is called saturation. If it reaches the saturation, the electric potential of the n-channel terminal of the photoelectric conversion element 111 no longer changes to make it impossible to output a signal in accordance with the correct intensity of light. Therefore, for the sake of normal operation, the device has to be operated in the manner that prevents the photoelectric conversion element 111 from reaching saturation.

A period started with reset of the pixel and ended with output of the signal is called an accumulation time. The accumulation time refers to a time in which a light receiving unit of an image sensor is irradiated with light and signals are accumulated, and is also called an exposure time. In the accumulation time, the photoelectric conversion element 111 accumulates electric charges generated from light that irradiates the photoelectric conversion element 111.

Accordingly, when the length of accumulation time differs, the total amount of electric charges generated from light also differs to vary the signal value even if the intensity of light is the same. For example, an intense light irradiating the photoelectric conversion element 111 causes saturation in a short accumulation time. A weak light irradiating the photoelectric conversion element 111 can also cause saturation if the accumulation time is long enough. In other words, the signal value is determined by the product of the intensity of light irradiating the photoelectric conversion element 111 and the length of accumulation time.

This embodiment may be combined freely with Embodiment Modes 1 through 3 and Embodiments 1 through 3.

Embodiment 5

Figure 19:
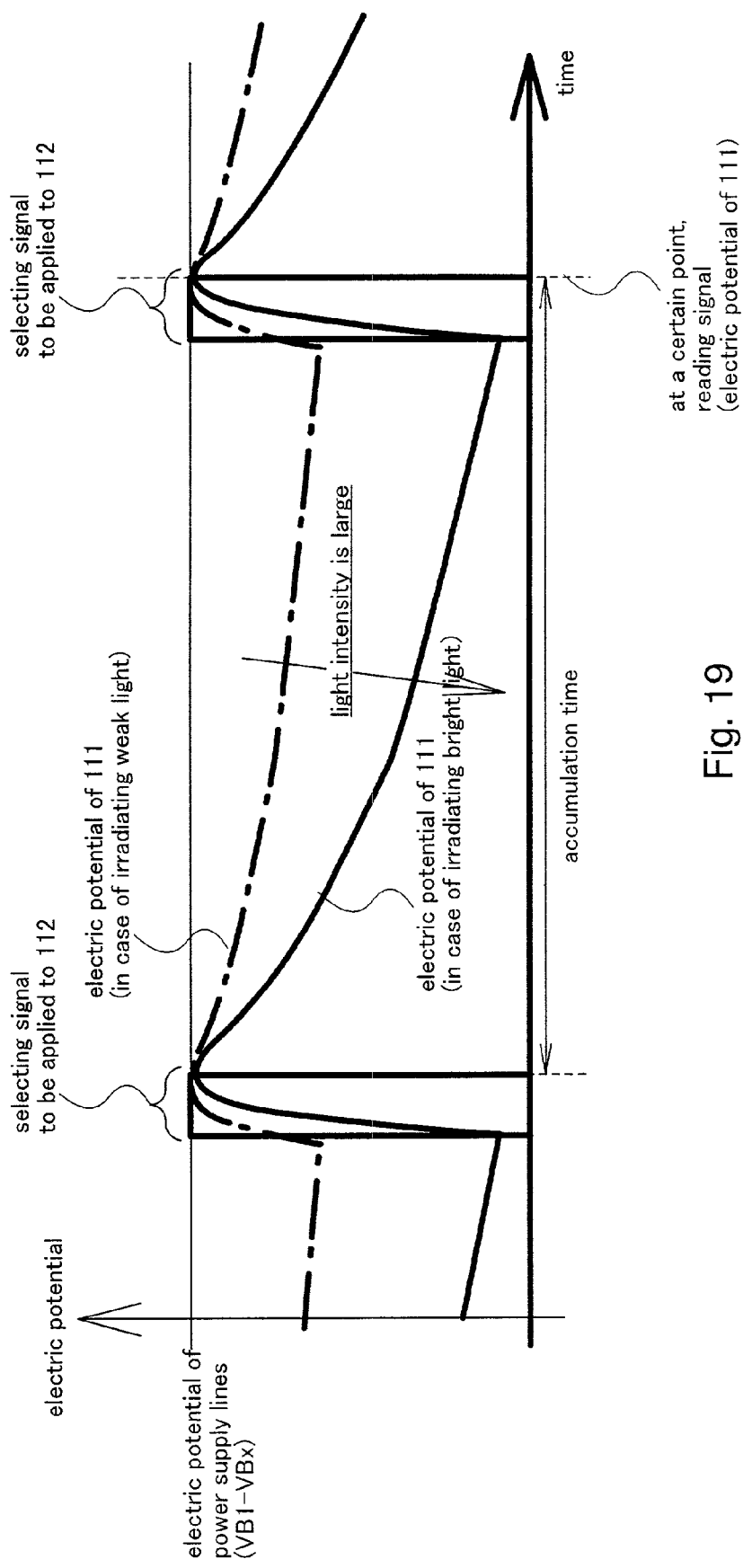
FIG. 19 is a diagram showing an operation mode of a semiconductor device to which the present invention can be applied.

This embodiment describes with reference to FIGS. 18 and 19 the electric potential of a photoelectric conversion element when reading a black calibration sheet. FIG. 18 is used to describe the electric potential of a photoelectric conversion element in an active semiconductor device and then FIG. 19 is used to describe the electric potential of a photoelectric conversion element in a passive semiconductor device.

In this embodiment, a resetting signal is applied to a sensor resetting transistor 114 in an active CMOS sensor semiconductor device. Described here is an operation of reading the electric potential of an n-channel terminal of a photoelectric conversion element 111 upon application of the resetting signal.

The electric potential of the n-channel terminal of the photoelectric conversion element 111 which is read upon application of the resetting signal to the sensor resetting transistor 114 is almost the same as the electric potential of the photoelectric conversion element 111 read after a black calibration sheet is read. In other words, the operation of reading the electric potential of the n-channel terminal of the photoelectric conversion element 111 upon application of the resetting signal to the sensor resetting transistor 114 is equal to the operation of reading a black calibration sheet. The reason is given below.

When reading a black calibration sheet, the photoelectric conversion element 111 is hardly irradiated with light. In other words, photoelectric conversion in the photoelectric conversion element 111 hardly takes place and no electric charges are accumulated in the photoelectric conversion element 111. Therefore, the electric potential of the n-channel terminal of the photoelectric conversion element 111 when reading a black calibration sheet has almost the same value as the electric potential of the sensor power supply lines (VB1 to VBx).

On the other hand, when the resetting signal is applied to the sensor resetting transistor 114, the n-channel terminal of the photoelectric conversion element 111 is also charged until its electric potential approximately reaches the level of the electric potential of the sensor power supply lines (VB1 to VBx).

This proves that the electric potential of the n-channel terminal of the photoelectric conversion element 111 which is read upon application of the resetting signal to the sensor resetting transistor 114 is almost the same as the electric potential of the photoelectric conversion element 111 read after a black calibration sheet is read.

The description above is of an active CMOS sensor semiconductor device. Referring to FIG. 19, a passive CMOS sensor semiconductor device is described below.

In the case of a passive semiconductor device, electric charges accumulated in the photoelectric conversion element 111 are read upon application of a selecting signal as shown in FIG. 19. Then the photoelectric conversion element 111 is immediately charged until its electric potential reaches the level of the electric potential of the sensor power supply lines (VB1 to VBx).

In this embodiment, electric charges accumulated in the photoelectric conversion element 111 are read when the photoelectric conversion element 111 is charged until its electric potential reaches the level of the electric potential of the sensor power supply lines (VB1 to VBx). In order to achieve this operation, application of one selecting signal is immediately followed by application of another selecting signal so that the accumulation time is shortened. Thereafter, the electric potential of the photoelectric conversion element 111 which is charged to reach the level of the electric potential of the sensor power supply lines (VB1 to VBx) is read.

Alternatively, the electric potential of the photoelectric conversion element 111 may be read when the photoelectric conversion element is charged until its electric potential reaches the level of the electric potential of the sensor power supply lines (VB1 to VBx) in a prolonged selecting signal application time. A signal of the photoelectric conversion element is thus read with a short accumulation time.

The descriptions given in this embodiment are about CMOS type semiconductor devices. However, the present invention is applicable to every semiconductor device that has an image sensor function, including a CCD type semiconductor device.

The semiconductor device operation described in this embodiment corresponds to Step 2 explained in Embodiment Modes in the present specification and illustrated in FIG. 2. This means that Step 1 for white calibration can be combined with this embodiment to determine whether there is a defective pixel and specify the coordinate of the defective pixel.

This embodiment may be combined freely with Embodiment Modes 1 through 3 and Embodiments 1 through 4.

Embodiment 6

This embodiment describes with reference to FIGS. 18 and 19 the electric potential of a photoelectric conversion element when reading a white calibration sheet. FIG. 18 is used to describe the electric potential of a photoelectric conversion element in an active semiconductor device and then FIG. 19 is used to describe the electric potential of a photoelectric conversion element in a passive semiconductor device.

The descriptions given in this embodiment are about the electric potential of a photoelectric conversion element 111 when the accumulation time of the photoelectric conversion element 111 is prolonged and the semiconductor device reads a white calibration sheet.

First, a specific description is given on the length of accumulation time of the photoelectric conversion element 111 to which the present invention is applied.

A dark current flowing in the photoelectric conversion element 11 is denoted by Id. The dark current Id is a current that flows in the photoelectric conversion element 111 even when the photoelectric conversion element 111 is not irradiated with light. The capacitance of the photoelectric conversion element 111 is given as C, and the accumulation time of the photoelectric conversion element 111 when the capacitance thereof is C is given as T. The voltage applied to both ends of the photoelectric conversion element upon application of a resetting signal is given as Vp. Then the amount of electric charges is given as Q and satisfies the following Expressions 4 and 5.

Expression 4

$$Q = C \times Vp \quad (4)$$

Expression 5

$$Q = Id \times T \quad (5)$$

The following Expression 6 is obtained from Expressions 4 and 5.

Expression 6

$$T = (C \times Vp)/Id \quad (6)$$

In this embodiment, the electric potential of the n-channel terminal of the photoelectric conversion element 111 is read when the accumulation time satisfies the following Expression 7.

Expression 7

$$T > (C \times Vp)/Id \quad (7)$$

The electric potential of the n-channel terminal of the photoelectric conversion element 111 which is read with the accumulation time satisfying Expression 7 is almost the same as the electric potential of the photoelectric conversion element 111 read after a white calibration sheet is read. In other words, the operation of reading the electric potential of the n-channel terminal of the photoelectric conversion element 111 when the accumulation time satisfies Expression 7 is equal to the operation of reading a white calibration sheet. The reason is given below.

When a white calibration sheet is read, the photoelectric conversion element 111 is irradiated with very bright light. In other words, photoelectric conversion nearing saturation takes place in the photoelectric conversion element 111 and electric charges are accumulated in the photoelectric conversion element 111. Therefore, the electric potential of the n-channel terminal of the photoelectric conversion element 111 is discharged almost completely when reading a white calibration sheet.

With the accumulation time satisfying Expression 7, the electric potential of the n-channel terminal of the photoelectric conversion element 111 is discharged almost completely and therefore the operation of reading the electric potential of the n-channel terminal of the photoelectric conversion element 111 is equal to the operation of reading a white calibration sheet.

This embodiment is effective for active semiconductor devices and passive semiconductor devices both. The embodiment is also effective for CCD type semiconductor devices.

The driving method of this embodiment corresponds to Step 1 explained in Embodiment Modes in the present specification and illustrated in FIG. 2. This means that Step 2 for black calibration can be combined with this embodiment to determine whether there is a defective pixel and specify the coordinate of the defective pixel.

This embodiment may be combined freely with Embodiment Modes 1 through 3 and Embodiments 1 through 5.

Embodiment 7

This embodiment deals with subject's images actually obtained by using the present invention, and an image of a window of a system according to the present invention. The system in this embodiment is made using Visual Basic ver. 6.0 (Microsoft) installed in a Windows 98 personal computer.

Figure 9:
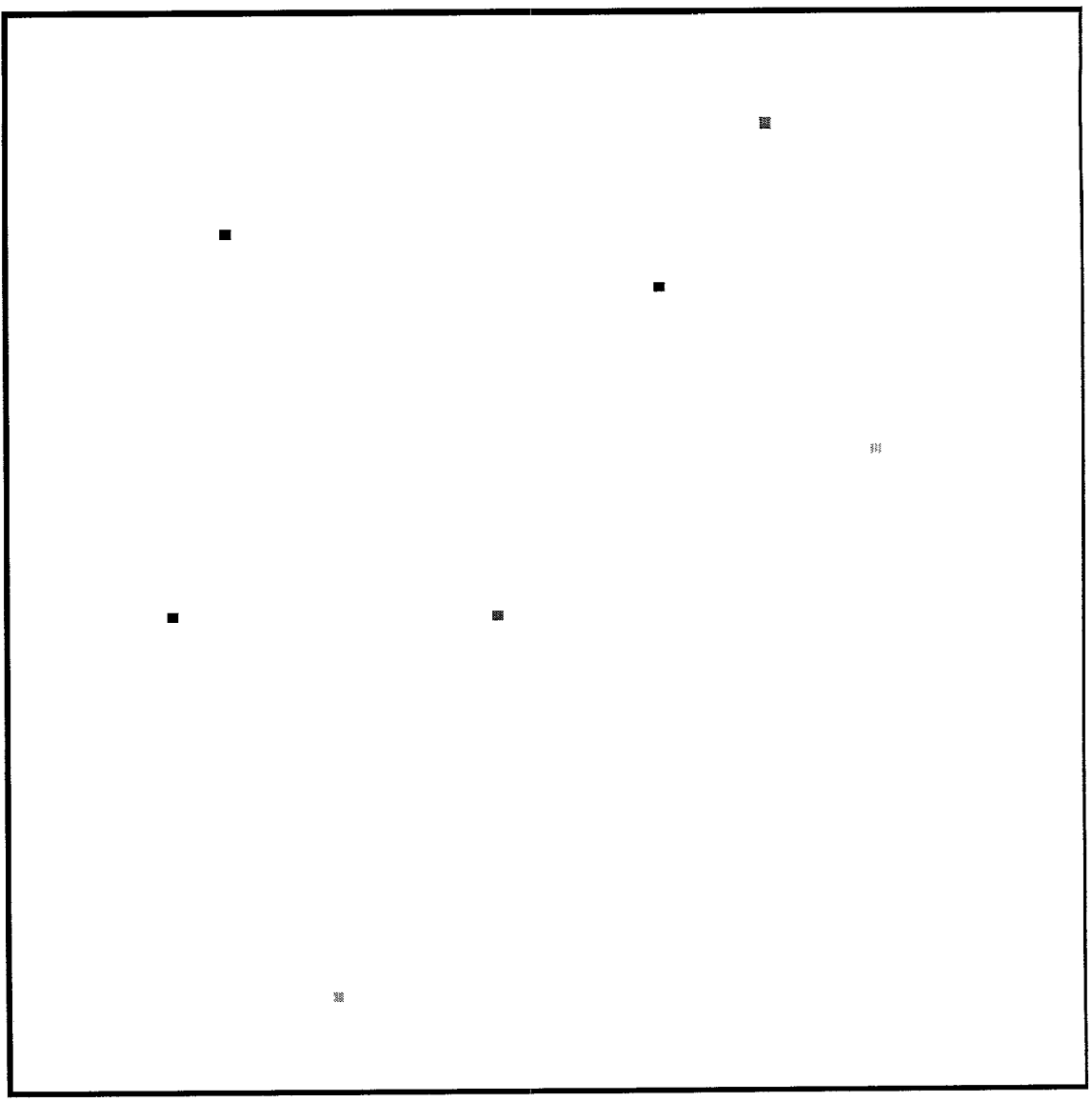
FIG. 9 is a diagram showing a mode of use of the present invention.
Figure 10:
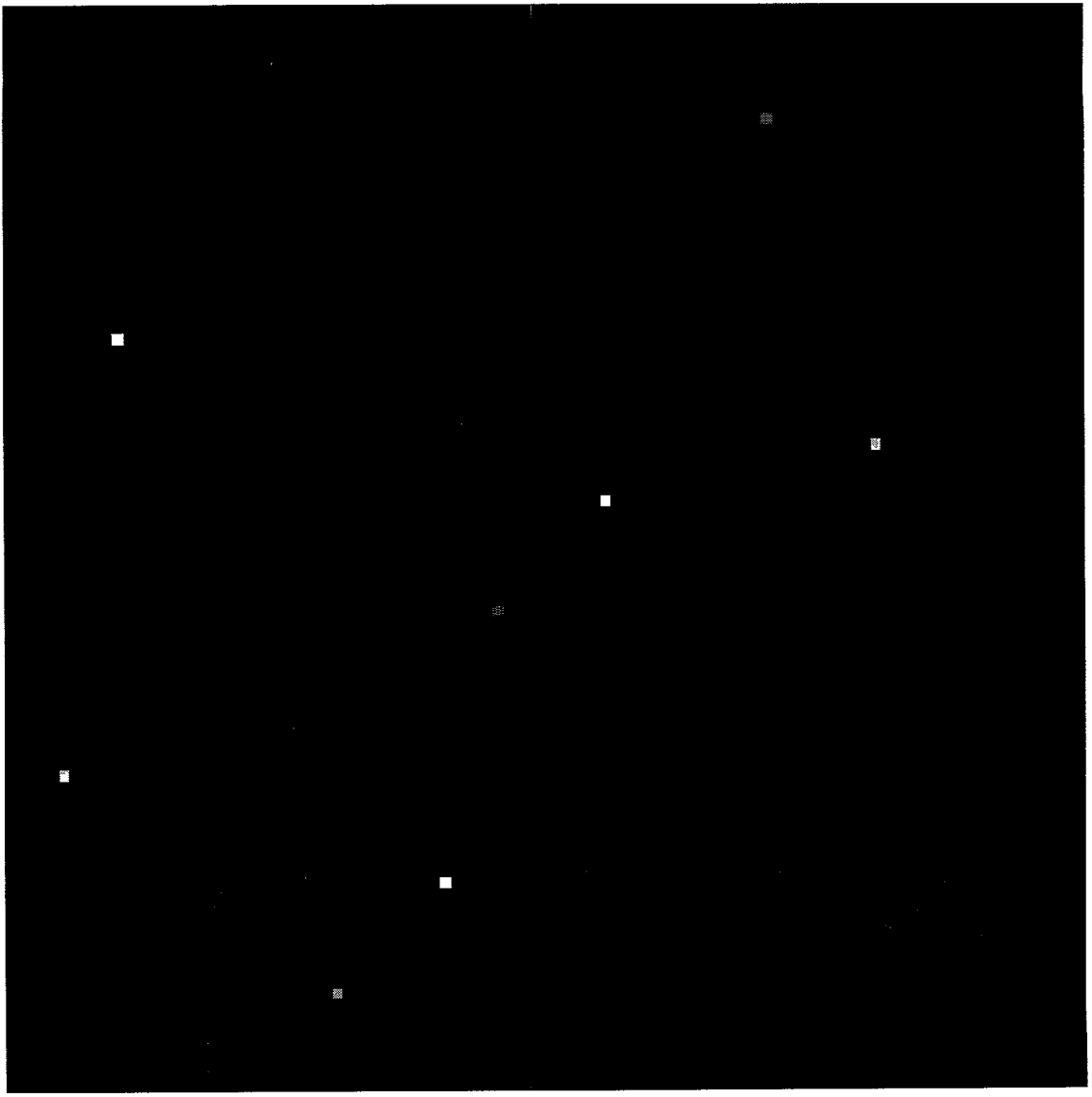
FIG. 10 is a diagram showing a mode of use of the present invention.

FIG. 9 shows an image obtained after white calibration. As shown in FIG. 9, defective pixels are displayed as black dots after white calibration is conducted. FIG. 10 shows an image obtained after black calibration. As shown in FIG. 10, defective pixels are displayed as white dots after black calibration is conducted. The defective pixels are specified from FIGS. 9 and 10.

Figure 11:
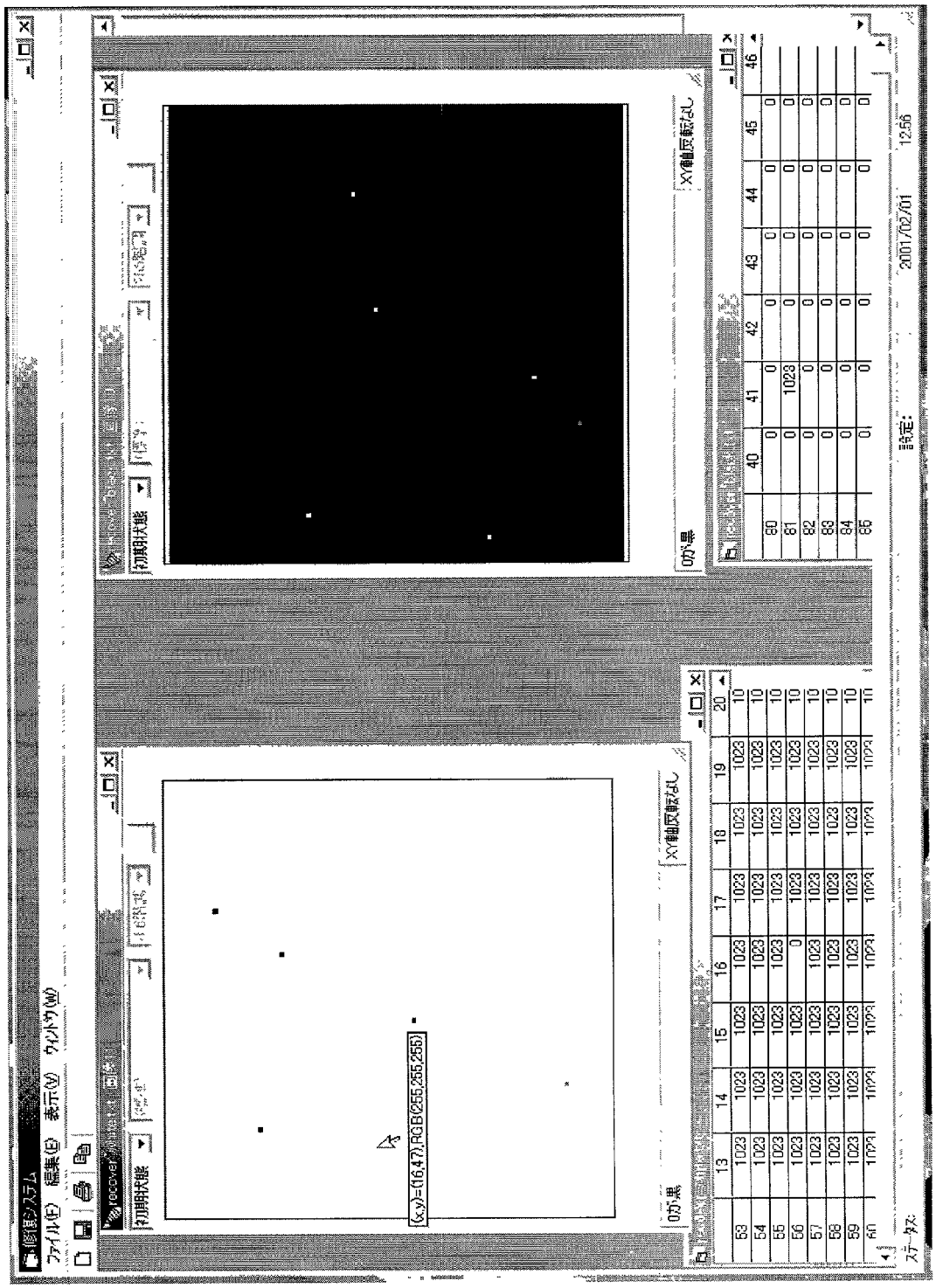
FIG. 11 is a diagram showing a mode of use of the present invention.

FIG. 11 shows a display screen of the personal computer when the system of the present invention is in operation. On the display screen of FIG. 11, the image obtained by white calibration and shown in FIG. 9 is displayed as well as a table in which image signals of the image are expressed as numbers. Also displayed on the screen are the image obtained by black calibration and shown in FIG. 10 and a table in which image signals of the image are expressed as numbers.

Figure 12:
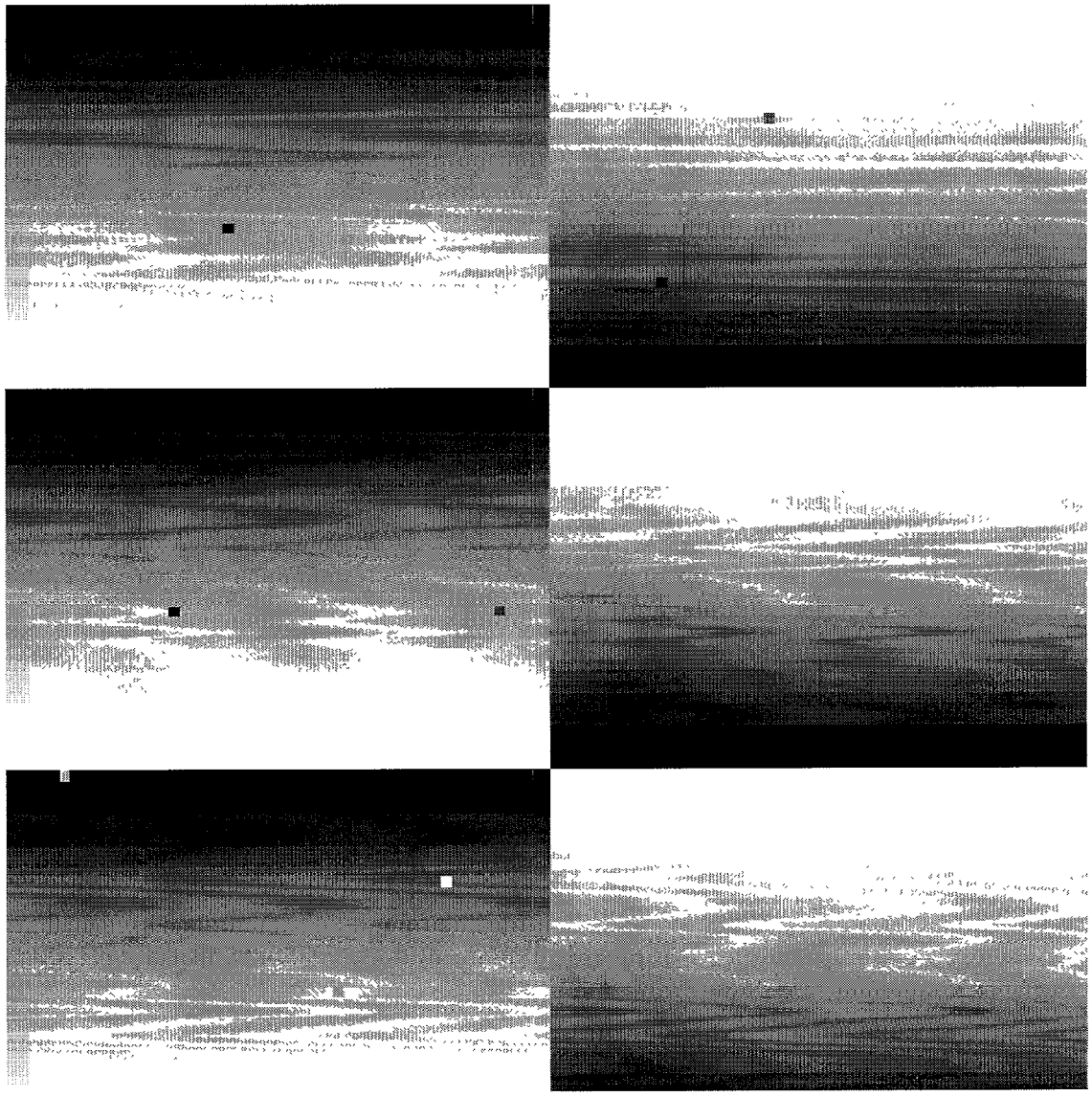
FIG. 12 is a diagram showing a mode of use of the present invention.
Figure 13:
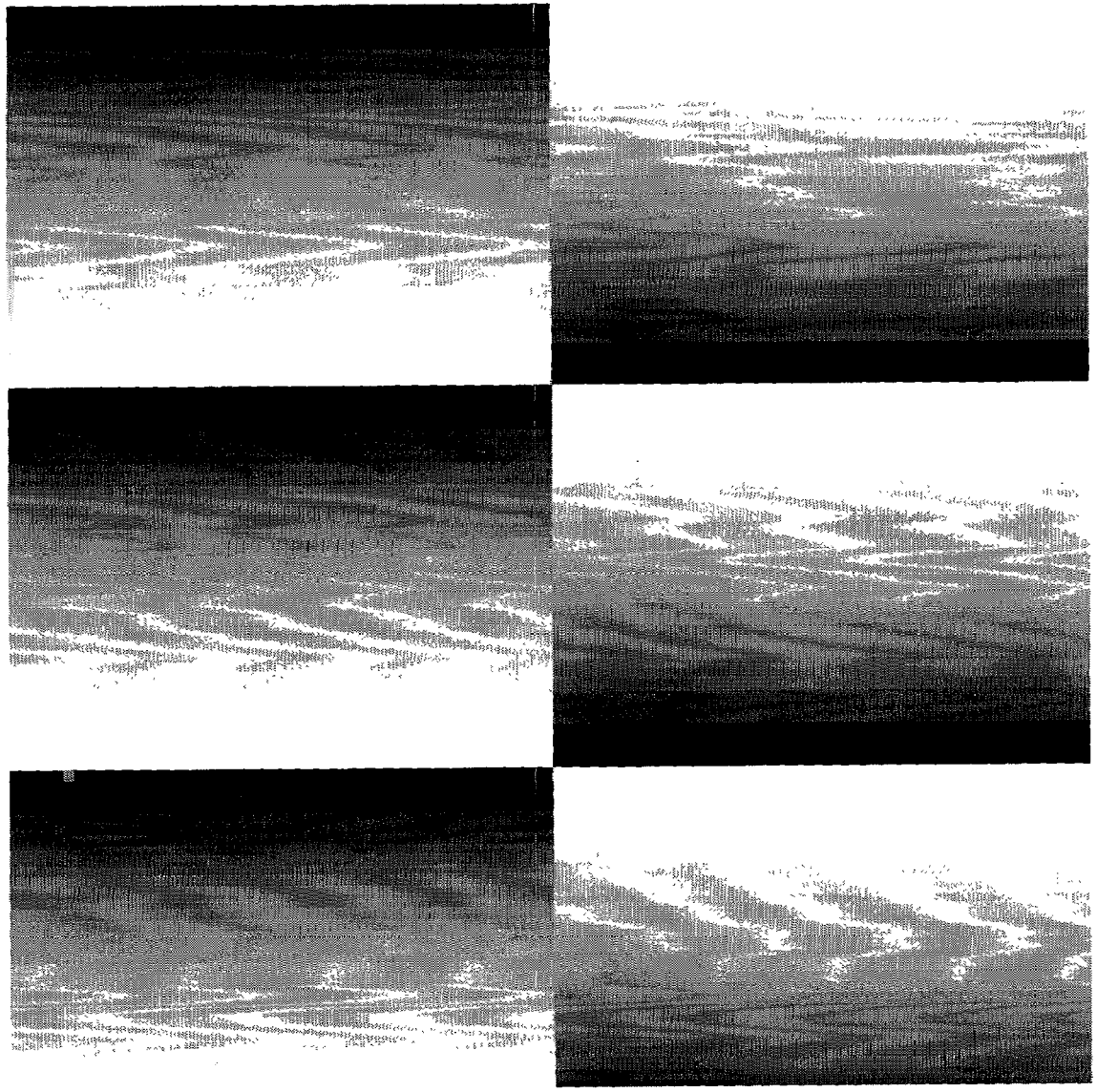
FIG. 13 is a diagram showing a mode of use of the present invention.

FIG. 12 shows an image of a subject read by a semiconductor device to which the present invention is not applied. FIG. 13 shows an image of the subject read by a semiconductor device to which the present invention is applied.

A comparison is made between FIGS. 12 and 13. In FIG. 12, defective pixels are displayed as black dots and white dots. In FIG. 13, on the other hand, defective pixels are inconspicuous and seem as if they are repaired because image signals of defective pixels are set based on image signals of pixels surrounding the defective pixels.

This embodiment may be combined freely with Embodiment Modes 1 through 3 and Embodiments 1 through 6.

Embodiment 8

Examples of electronic equipment using a semiconductor device of the present invention are described with reference to FIGS. 14A to 14D.

Figure 14A:
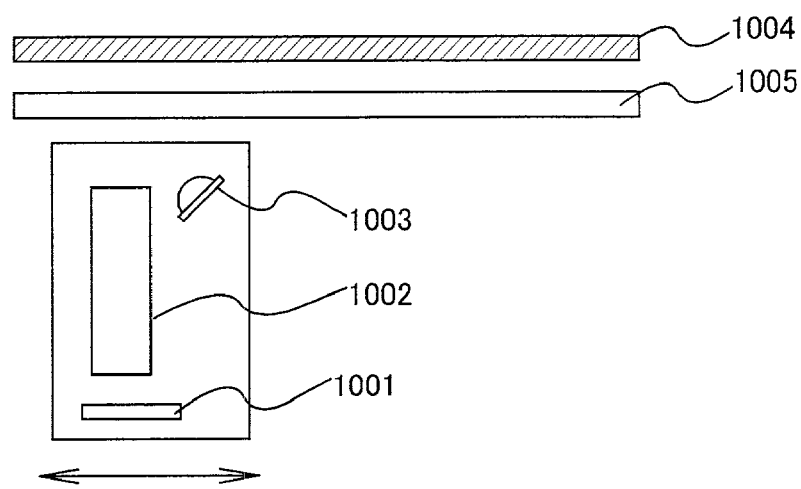
FIGS. 14A to 14D are diagrams of electronic equipment to which the present invention can be applied.

FIG. 14A shows a hand scanner using a line sensor. An optical system 1002 such as a rod lens array is provided above a CCD type (CMOS type) image sensor 1001. The optical system 1002 is used to project an image of a subject 1004 onto the image sensor 1001.

A light source 1003 such as an LED or fluorescent is positioned so as to irradiate the subject 1004 with light. Glass 1005 is placed under the subject 1004.

Light emitted from the light source 1003 enters the subject 1004 through the glass 1005. The light reflected by the subject 1004 enters the optical system 1002 through the glass 1005. After entering the optical system 1002, the light enters the image sensor 1001 to be subjected to photoelectric conversion in there.

Figure 14B:
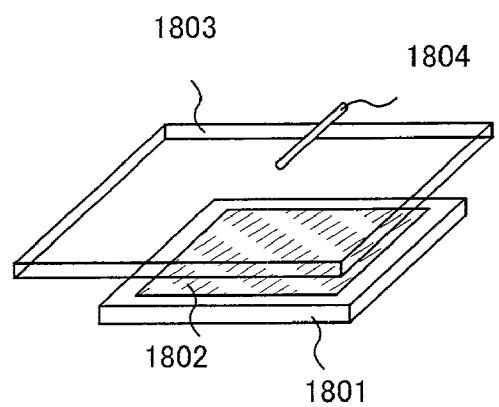

In FIG. 14B, 1801 denotes a substrate; 1802, a pixel portion; 1803, a touch panel; and 1804, a touch pen. The touch panel 1803 is light-transmissive and transmits light emitted from the pixel portion 1802 as well as light entering the pixel portion 1802. The device thus can read an image of a subject through the touch panel 1803. An image on the pixel portion 1802 can be seen through the touch panel 1803 while the pixel portion 1802 is displaying an image.

When the touch pen 1804 comes into contact with the touch panel 1803, the positional information of the point where the touch pen 1804 is in contact with the touch panel 1803 can be sent as an electric signal to the semiconductor device. Any known touch panel and touch pen may be used as the touch panel 1803 and the touch pen 1804 of this embodiment as long as the touch panel is light-transmissive and the positional information of the point where the touch pen is in contact with the touch panel is sent as an electric signal to the semiconductor device.

The semiconductor device structured as above in accordance with the present invention reads information of an image to display the read image in the pixel portion 1802, and allows a user to write or draw on the displayed image with the touch pen 1804. In the semiconductor device of the present invention, the pixel portion 1802 handles all of reading an image, displaying the image, and writing or drawing on the image. Accordingly, it is possible for the semiconductor device to reduce its size and have various functions.

Figure 14C:
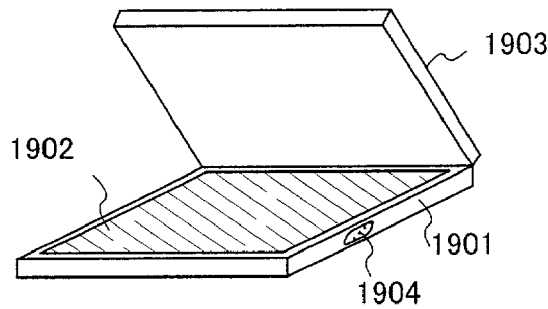
Figure 14D:
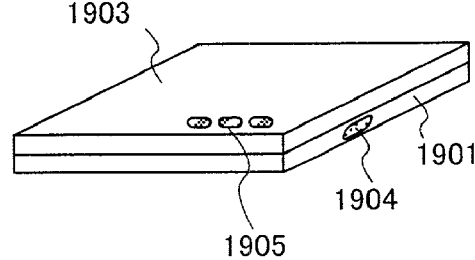

FIG. 14C shows a portable hand scanner different from the one in FIG. 14B. The scanner in FIG. 14C is composed of a main body 1901, a pixel portion 1902, a top cover 1903, an external connection port 1904, and operation switches 1905. FIG. 14D shows the same portable hand scanner as the one in FIG. 14C with the top cover 1903 closed.

The semiconductor device of the present invention can display information of a read image in the pixel portion 1902 to allow a user to immediately confirm the image read without adding a display to the semiconductor device.

An image signal read by the pixel portion 1902 may be sent to electronic equipment externally connected to the portable hand scanner through the external connection port 1904. Then the data can be processed in a personal computer to correct, synthesize, or edit the image.

This embodiment may be combined freely with Embodiment Modes 1 through 3 and Embodiments 1 through 7.

Embodiment 9

Given as examples of electronic equipment using a semiconductor device of the present invention are a video camera, a digital still camera, a notebook computer, and a portable information terminal (such as a mobile computer, a cellular phone, a portable game machine, or an electronic book).

Figure 15A:
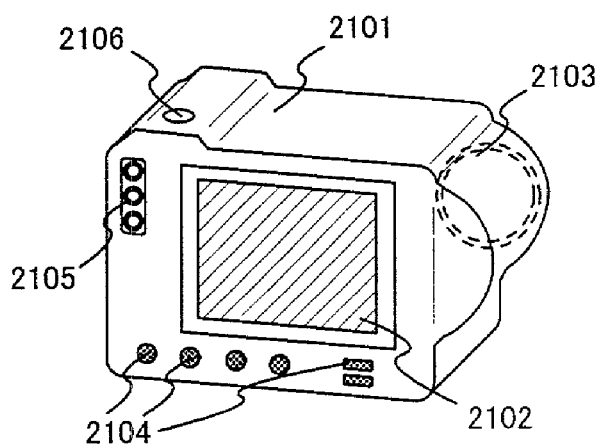
FIGS. 15A to 15C are diagrams of electronic equipment to which the present invention can be applied.

FIG. 15A shows a video camera, which is composed of a main body 2101, a display unit 2102, an image receiving unit 2103, an external connection port 2105, operation keys 2104, a shutter 2106, etc. The present invention can be applied to the display unit 2102.

Figure 15B:
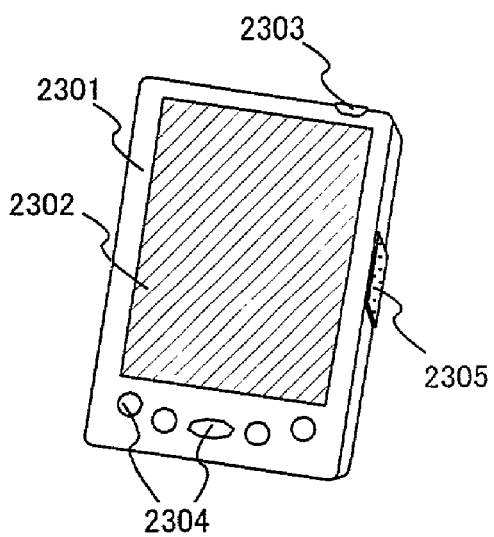

FIG. 15B shows a mobile computer, which is composed of a main body 2301, a display unit 2302, a switch 2303, operation keys 2304, an infrared port 2305, etc. The present invention can be applied to the display unit 2302.

Figure 15C:
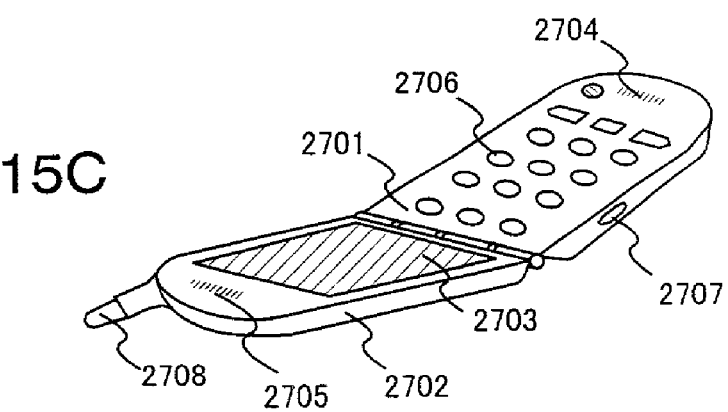

FIG. 15C shows a cellular phone, which is composed of a main body 2701, a case 2702, a display unit 2703, an audio input unit 2704, an audio output unit 2705, operation keys 2706, an external connection port 2707, an antenna 2708, etc. The present invention can be applied to the display unit 2703.

As described above, the present invention has so wide an application range that it is applicable to electronic equipment of any field.

This embodiment may be combined freely with Embodiment Modes 1 through 3 and Embodiments 1 through 8.

With the defective pixel specifying method of the present invention, it is easy to determine whether there is a defective pixel and specify the coordinate of the defective pixel. Furthermore, an image signal of the defective pixel can readily be set by using the image correcting method of the present invention. As a result, the defective pixel seems as if it is repaired. The present invention gives a semiconductor device having a defective pixel the same level of image sensor function as exhibited by a semiconductor device that has no defective pixel. Therefore the invention can improve the product yield.

What is claimed is:

1. A device comprising:
    a pixel portion having a plurality of pixels each comprising a photoelectric conversion element and a light emitting element; and
    means for determining a defective pixel,
    wherein the defective pixel is determined by the steps of:
    reading a first calibration sheet to obtain a first image signal of each of the plurality of pixels by using the photoelectric conversion element;

reading a second calibration sheet to obtain a second image signal of each of the plurality of pixels by using the photoelectric conversion element;

calculating a first difference between the first and second image signals of each of the plurality of pixels;

obtaining at least a value selected from a modal value, an average value and a maximum value of the first difference of each of the plurality of pixels; and determining whether each of the plurality of pixels is the defective pixel by obtaining a second difference between the first difference of each of the plurality of pixels and the value selected from a modal value, an average value and a maximum value of the first difference of the plurality of pixels.

2. A device comprising:

a pixel portion having a plurality of pixels each comprising a photoelectric conversion element and a light emitting element; and means for determining a defective pixel, wherein the defective pixel is determined by the steps of:

reading a first calibration sheet to obtain a first image signal of each of the plurality of pixels by using the photoelectric conversion element;

reading a second calibration sheet to obtain a second image signal of each of the plurality of pixels by using the photoelectric conversion element;

calculating a first ratio between the first and second image signals of each of the plurality of pixels;

obtaining at least a value selected from a modal value, an average value and a maximum value of the first ratio of the plurality of pixels; and determining whether each of the plurality of pixels is the defective pixel by obtaining a second ratio between the first ratio of the plurality of pixels and the value selected from a modal value, an average value and a maximum value of the first ratio of the plurality of pixels.

3. A device according to claim 1, wherein the device is at least a device selected from the group of a hand scanner, a video camera, a digital still camera, a notebook computer, a mobile computer, a cellular phone, a portable game machine and an electronic book.

4. A device according to claim 2, wherein the device is at least a device selected from the group of a hand scanner, a video camera, a digital still camera, a notebook computer, a mobile computer, a cellular phone, a portable game machine and an electronic book.

5. A device comprising:

a pixel portion having a plurality of pixels each comprising a photoelectric conversion element and a light emitting element; and means for determining a defective pixel, wherein the defective pixel is determined by the steps of:

obtaining a first image signal of each of the plurality of pixels by using the photoelectric conversion element;

reading a calibration sheet to obtain a second image signal of each of the plurality of pixels by using the photoelectric conversion element;

calculating a first difference between the first and second image signals of each of the plurality of pixels;

obtaining at least a value selected from a modal value, an average value and a maximum value of the first difference of each of the plurality of pixels; and determining whether each of the plurality of pixels is a defective pixel by obtaining a second difference between the first difference of each of the plurality of pixels and the value selected from a modal value, an average value and a maximum value of the first difference of the plurality of pixels, wherein the first image signal of each of the plurality of pixels is obtained while $T>\{C \times Vp/Id\}$ is satisfied, where T is an accumulation time, C is a capacitance of the photoelectric conversion element, Vp is a voltage applied to the photoelectric conversion element, and Id is a dark current flowing in the photoelectric conversion element.

6. A device comprising:

a pixel portion having a plurality of pixels each comprising a photoelectric conversion element and a light emitting element; and means for determining a defective pixel, wherein the defective pixel is determined by the steps of:

obtaining a first image signal of each of the plurality of pixels by using the photoelectric conversion element;

reading a calibration sheet to obtain a second image signal of each of the plurality of pixels by using the photoelectric conversion element;

calculating a first ratio between the first and second image signals of each of the plurality of pixels;

obtaining at least a value selected from a modal value, an average value and a maximum value of the first ratio of the plurality of pixels; and determining whether each of the plurality of pixels is a defective pixel by obtaining a second ratio between the first ratio of the plurality of pixels and the value selected from a modal value, an average value and a maximum value of the first ratio of the plurality of pixels, wherein the first image signal of each of the plurality of pixels is obtained while $T>\{C \times Vp/Id\}$ is satisfied, where T is an accumulation time, C is a capacitance of the photoelectric conversion element, Vp is a voltage applied to the photoelectric conversion element, and Id is a dark current flowing in the photoelectric conversion element.

7. A device comprising:

a pixel portion having a plurality of pixels each comprising a photoelectric conversion element and a light emitting element; and means for determining a defective pixel, wherein the defective pixel is determined by the steps of:

obtaining a first image signal of each of the plurality of pixels by using the photoelectric conversion element;

reading a calibration sheet to obtain a second image signal of each of the plurality of pixels by using the photoelectric conversion element;

calculating a first difference between the first and second image signals of each of the plurality of pixels;

obtaining at least a value selected from a modal value, an average value and a maximum value of the first difference of the plurality of pixels; and determining whether each of the plurality of pixels is a defective pixel by obtaining a second difference between the first difference of the plurality of pixels and the value selected from a modal value, an average value and a maximum value of the first difference of the plurality of pixels, wherein the first image signal of each of the plurality of pixels is obtained while an accumulation time of the photoelectric conversion element is 0.

8. A device comprising:

a pixel portion having a plurality of pixels each comprising a photoelectric conversion element and a light emitting element; and means for determining a defective pixel,
wherein the defective pixel is determined by the steps of:
obtaining a first image signal of each of the plurality of pixels by using the photoelectric conversion element;
reading a calibration sheet to obtain a second image signal of each of the plurality of pixels by using the photoelectric conversion element;
calculating a first ratio between the first and second image signals of each of the plurality of pixels;
obtaining at least a value selected from a modal value, an average value and a maximum value of the first ratio of the plurality of pixels; and
determining whether each of the plurality of pixels is a defective pixel by obtaining a second ratio between the first ratio of the plurality of pixels and the value selected from a modal value, an average value and a maximum value of the first ratio of the plurality of pixels,
wherein the first image signal of each of the plurality of pixels is obtained while an accumulation time of the photoelectric conversion element is 0.

9. A device comprising:
a pixel portion having a plurality of pixels each comprising a photoelectric conversion element and a light emitting element; and
means for determining a defective pixel,
wherein the defective pixel is determined by the steps of:
obtaining a first image signal of each of the plurality of pixels by using the photoelectric conversion element;
obtaining a second image signal of each of the plurality of pixels by using the photoelectric conversion element;
calculating a first difference between the first and second image signals of each of the plurality of pixels;
obtaining at least a value selected from a modal value, an average value and a maximum value of the first difference of the plurality of pixels; and
determining whether each of the plurality of pixels is a defective pixel by obtaining a second difference between the first difference of the plurality of pixels and the value selected from a modal value, an average value and a maximum value of the first difference of the plurality of pixels,
wherein the first image signal of each of the plurality of pixels is obtained while $T>\{C\times Vp/Id\}$ is satisfied, where T is an accumulation time, C is a capacitance of the photoelectric conversion element, Vp is a voltage applied to the photoelectric conversion element, and Id is a dark current flowing in the photoelectric conversion element, and
wherein the second image signal of each of the plurality of pixels is obtained while an accumulation time of the photoelectric conversion element is 0.

10. A device comprising:
a pixel portion having a plurality of pixels each comprising a photoelectric conversion element and a light emitting element; and
means for determining a defective pixel,
wherein the defective pixel is determined by the steps of:
obtaining a first image signal of each of the plurality of pixels by using the photoelectric conversion element:
obtaining a second image signal of each of the plurality of pixels by using the photoelectric conversion element;
calculating a first ratio between the first and second image signals of each of the plurality of pixels;
obtaining at least a value selected from a modal value, an average value and a maximum value of the first ratio of the plurality of pixels; and
determining whether each of the plurality of pixels is a defective pixel by obtaining a second ratio between the first ratio of the plurality of pixels and the value selected from a modal value, an average value and a maximum value of the first ratio of the plurality of pixels,
wherein the first image signal of each of the plurality of pixels is obtained while $T>\{C\times Vp/Id\}$ is satisfied, where T is an accumulation time, C is a capacitance of the photoelectric conversion element, Vp is a voltage applied to the photoelectric conversion element, and Id is a dark current flowing in the photoelectric conversion element, and
wherein the second image signal of each of the plurality of pixels is obtained while an accumulation time of the photoelectric conversion element is 0.

11. A device according to claim 5, wherein the device is at least a device selected from the group of a hand scanner, a video camera, a digital still camera, a notebook computer, a mobile computer, a cellular phone, a portable game machine and an electronic book.

12. A device according to claim 6, wherein the device is at least a device selected from the group of a hand scanner, a video camera, a digital still camera, a notebook computer, a mobile computer, a cellular phone, a portable game machine and an electronic book.

13. A device according to claim 7, wherein the device is at least a device selected from the group of a hand scanner, a video camera, a digital still camera, a notebook computer, a mobile computer, a cellular phone, a portable game machine and an electronic book.

14. A device according to claim 8, wherein the device is at least a device selected from the group of a hand scanner, a video camera, a digital still camera, a notebook computer, a mobile computer, a cellular phone, a portable game machine and an electronic book.

15. A device according to claim 9, wherein the device is at least a device selected from the group of a hand scanner, a video camera, a digital still camera, a notebook computer, a mobile computer, a cellular phone, a portable game machine and an electronic book.

16. A device according to claim 10, wherein the device is at least a device selected from the group of a hand scanner, a video camera, a digital still camera, a notebook computer, a mobile computer, a cellular phone, a portable game machine and an electronic book.

* * * * *